(12) United States Patent
Abe

(10) Patent No.: US 8,270,020 B2
(45) Date of Patent: Sep. 18, 2012

(54) SYSTEM, SERVER, SERVER CONTROL METHOD, AND STORAGE MEDIUM FOR CONTROLLING USE OF SHARED DEVICES

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/472,136

(22) Filed: May 26, 2009

(65) Prior Publication Data
US 2009/0303531 A1    Dec. 10, 2009

(30) Foreign Application Priority Data

Jun. 5, 2008   (JP) ................. 2008-148325

(51) Int. Cl.
*G06F 3/12*   (2006.01)
(52) U.S. Cl. ............... 358/1.15; 358/1.13; 358/1.14; 726/4
(58) Field of Classification Search ............ None
See application file for complete search history.

(56) References Cited

U.S. PATENT DOCUMENTS

| | | | | |
|---|---|---|---|---|
| 5,625,757 | A | * | 4/1997 | Kageyama et al. ......... 358/1.14 |
| 2006/0123080 | A1 | * | 6/2006 | Baudino et al. ............ 709/204 |
| 2008/0046436 | A1 | | 2/2008 | Watanabe |

FOREIGN PATENT DOCUMENTS

| | | |
|---|---|---|
| JP | 2004-236105 | 8/2004 |
| JP | 2007-316843 | 12/2007 |

* cited by examiner

*Primary Examiner* — Marivelisse Santiago Cordero
*Assistant Examiner* — Aaron R Gerger
(74) *Attorney, Agent, or Firm* — Cowan, Liebowitz & Latman, P.C.

(57) ABSTRACT

The present invention provides a system that registers, in a second information processing apparatus, device information unique to a peripheral device capable of connecting to a first information processing apparatus, wherein the first information processing apparatus includes an addition unit configured to add, to the device information, information indicating whether the device information was manually inputted to the first information processing apparatus in response to operations of a user or was automatically inputted to the first information processing apparatus by the peripheral device, and the second information processing apparatus includes a registration unit configured to register, in the database, device information to which has been added the information indicating the device information was automatically inputted, and device information to which the information indicating the device information was manually inputted has been added and that has been determined to not yet be registered in the database, in association with user information.

10 Claims, 25 Drawing Sheets

FIG. 9

| | |
|---|---|
| Web Browser | _ □ ✕ |

REGISTERED INFORMATION UPDATE

UPDATE

CANCEL

MANUAL ADD

REMOVE

AUTOMATIC ADD

MEMBER INFORMATION

| NAME : | Chancy |
| ADDRESS : | Oahu 1-1-1 |
| EMAIL ADDRESS : | xxx@yyy.zzz |
| PASSWORD : | ******** |

| MANUFACTURER NAME : | ABC |
| MODEL NAME : | |
| SERIAL NUMBER : | |

| MANUFACTURER NAME | MODEL NAME | SERIAL NUMBER |
|---|---|---|
| ☐ ABC | Printer Kmmn | 8888 |
| ☑ ABC | Camera MMM | 1234 |

FIG. 13A

REQ:DeviceInfo

FIG. 13B

MFG:ABC;MDL:Printer Kmmn;CLS:PRINTER;DES:ABC Printer Kmmn;SN:8888;VER:1.00;

FIG. 13C

MFG:ABC;MDL:Camera MMM;CLS:CAMERA,STORAGE;DES:ABC Camera MMM;SN:1234;VER:2.00;

F I G. 14

| NAME | MEMBER INFORMATION ADDRESS | | | DEVICE INFORMATION | |
|---|---|---|---|---|---|
| Chancy | ADDRESS : | Oahu 1-1-1 | 1 | MANUFACTURER NAME : | ABC |
| | EMAIL ADDRESSA : | xxx@yyy.zzz | | MODEL NAME : | Printer Kmmn |
| | PASSWORD : | oreoreoreo | | SERIAL NUMBER : | 8888 |
| | | | 2 | MANUFACTURER NAME : | ABC |
| | | | | MODEL NAME : | Camera MMM |
| | | | | SERIAL NUMBER : | 1234 |
| Mami | ADDRESS : | Oahu 1-1-1 | 1 | MANUFACTURER NAME : | ABC |
| | EMAIL ADDRESS : | mmm@yyy.zzz | | MODEL NAME : | Printer Kmmn |
| | PASSWORD : | watashiwat | | SERIAL NUMBER : | 8888 |
| Misachan | ADDRESS : | Maui 2-2-2 | 1 | MANUFACTURER NAME : | ABC |
| | EMAIL ADDRESSA : | aaa@bbb.ccc | | MODEL NAME : | Camera KKK |
| | PASSWORD : | konohakunk | | SERIAL NUMBER : | 777 |
| Natchan | ADDRESS : | Kauai 3-3-3 | 1 | MANUFACTURER NAME : | ABC |
| | EMAIL ADDRESSA : | ddd@eee.fff | | MODEL NAME : | Printer Kmmn |
| | PASSWORD : | pikachupik | | SERIAL NUMBER : | 5678 |
| | | | 2 | MANUFACTURER NAME : | ABC |
| | | | | MODEL NAME : | Printer Xyz |
| | | | | SERIAL NUMBER : | 5678 |
| | | | 3 | MANUFACTURER NAME : | ABC |
| | | | | MODEL NAME : | Phone Nmmk |
| | | | | SERIAL NUMBER : | 8888777 |

Web Browser

NEW MEMBER REGISTRATION

REGISTER

CANCEL

MEMBER INFORMATION

NAME :
ADDRESS :
EMAIL ADDRESS :
PASSWORD :

DEVICE INFORMATION

MANUFACTURER NAME : ABC
MODEL NAME : Camera KKK
SERIAL NUMBER : 777

MANUAL ADD

REMOVE

| | MANUFACTURER NAME | MODEL NAME | SERIAL NUMBER |
|---|---|---|---|
| ☐ | ABC | Printer Kmmn | 8888 |

AUTOMATIC ADD

2202

THE DEVICE 'ABC CAMERA KKK, SERIAL NUMBER 777' CANNOT BE ADDED MANUALLY BECAUSE IT IS ALREADY REGISTERED. PLEASE RECHECK THE DEVICE INFORMATION AND MANUALLY ADD THE DEVICE, OR CONNECT THE DEVICE AND WAIT FOR IT TO BE AUTOMATICALLY ADDED.

FIG. 21

| DEVICE | SHARING ALLOWED/PROHIBITED |
|---|---|
| Printer Kmmn | ALLOWED |
| Printer Xyz | ALLOWED |
| Camera KKK | PROHIBITED |
| Camera MMM | PROHIBITED |
| Phone Nmmk | PROHIBITED |

| NAME | MEMBER INFORMATION ADDRESS | | DEVICE INFORMATION | |
|---|---|---|---|---|
| Koichi | ADDRESS : | Oahu 5-5-5 | | |
| | EMAIL ADDRESSA : | koi@yyy.zzz | 1 | MANUFACTURER NAME : ABC |
| | | | | MODEL NAME : Printer Kmmn |
| | PASSWORD : | bokubokubo | | SERIAL NUMBER : 800 |
| | | | 2 | MANUFACTURER NAME : ABC |
| | | | | MODEL NAME : Camera KKK |
| | | | | SERIAL NUMBER : 555 |
| Abe | ADDRESS : | Oahu 5-5-5 | | |
| | EMAIL ADDRESSA : | abe@yyy.zzz | 1 | MANUFACTURER NAME : ABC |
| | | | | MODEL NAME : Printer Kmmn |
| | PASSWORD : | princeabe | | SERIAL NUMBER : 800 |
| Konoha | ADDRESS : | Oahu 5-5-5 | | |
| | EMAIL ADDRESSA : | kon@yyy.zzz | 1 | MANUFACTURER NAME : ABC |
| | | | | MODEL NAME : Printer Kmmn |
| | PASSWORD : | hamsterham | | SERIAL NUMBER : 800 |
| Teru | ADDRESS : | Oahu 5-5-5 | | |
| | EMAIL ADDRESSA : | ter@yyy.zzz | 1 | MANUFACTURER NAME : ABC |
| | | | | MODEL NAME : Printer Kmmn |
| | PASSWORD : | mommommomm | | SERIAL NUMBER : 800 |

USAGE STATUS AT TIME A

<table>
<tr><th rowspan="2">NAME</th><th colspan="3">ONLINE PHOTO ALBUM</th><th colspan="3">GRAPHICS PRINTING</th></tr>
<tr><th>USED CAPACITY</th><th>REMAINING USABLE CAPACITY[MB]</th><th>MAXIMUM USABLE CAPACITY[MB]</th><th>USED PRINTING TICKETS</th><th>REMAINING PRINTING TICKETS</th><th>MAXIMUM USABLE PRINTING TICKETS</th></tr>
<tr><td>Koichi</td><td>10</td><td>140</td><td>200</td><td>0</td><td>7</td><td>10</td></tr>
<tr><td>Abe</td><td>20</td><td>50</td><td>100</td><td>1</td><td>2</td><td>5</td></tr>
<tr><td>Konoha</td><td>30</td><td>50</td><td>100</td><td>0</td><td>2</td><td>5</td></tr>
<tr><td>Teru</td><td>0</td><td>50</td><td>100</td><td>2</td><td>2</td><td>5</td></tr>
</table>

USAGE STATUS AT TIME A

<table>
<tr><th rowspan="2">NAME</th><th colspan="3">ONLINE PHOTO ALBUM</th><th colspan="3">GRAPHICS PRINTING</th></tr>
<tr><th>USED CAPACITY</th><th>REMAINING USABLE CAPACITY[MB]</th><th>MAXIMUM USABLE CAPACITY[MB]</th><th>USED PRINTING TICKETS</th><th>REMAINING PRINTING TICKETS</th><th>MAXIMUM USABLE PRINTING TICKETS</th></tr>
<tr><td>Koichi</td><td>10</td><td>110</td><td>200</td><td>3</td><td>3</td><td>10</td></tr>
<tr><td>Abe</td><td>10</td><td>20</td><td>100</td><td>1</td><td>1</td><td>5</td></tr>
<tr><td>Konoha</td><td>40</td><td>20</td><td>100</td><td>1</td><td>1</td><td>5</td></tr>
<tr><td>Teru</td><td>30</td><td>20</td><td>100</td><td>2</td><td>1</td><td>5</td></tr>
</table>

3800B

F I G. 26
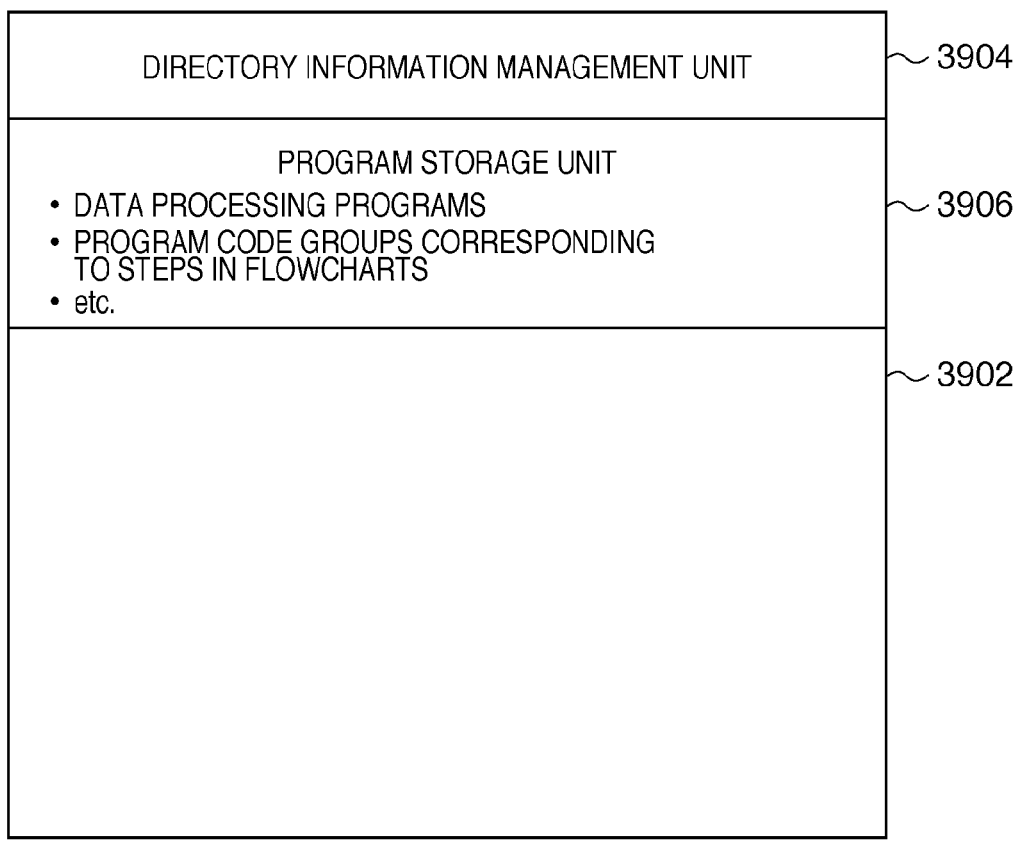

SYSTEM, SERVER, SERVER CONTROL METHOD, AND STORAGE MEDIUM FOR CONTROLLING USE OF SHARED DEVICES

BACKGROUND OF THE INVENTION

1. Field of the Invention

The present invention relates to a system, server, server control method, and storage medium for managing information in a device connected to a client apparatus.

2. Description of the Related Art

The recent advancements in information processing apparatus and network infrastructures have led to the rapid spread of printers, copy machines, facsimile machines, scanners, digital still cameras, digital video cameras, mobile telephones, and devices provided with the a combination of such functions (peripheral devices). Along with this, membership-based services (for example, online photo albums, graphics printing, photo printing, paper models, and so on) that utilize an information processing apparatus and a peripheral processing device connected via a network are being provided by various companies.

Such membership-based services generally provide the appropriate service to a user when a user who purchased a peripheral device or a user who possesses a peripheral device performs member registration. This member registration uses information of the peripheral device the user purchased or the peripheral device the user possesses, such as the manufacturer name, model name, serial number, or the like (device information) so as to register and manage the user (a username) and the device information in association with each other. To be more specific, a single username is allocated to a single peripheral device, and the two are registered and managed in such a manner, thereby preventing the unauthorized use of the service by a third party that has not purchased or does not own the peripheral device.

Japanese Patent Laid-Open No. 2004-236105 and Japanese Patent Laid-Open No. 2007-316843 propose such a technique.

When the peripheral device is, for example, a stationary printer, that printer is generally shared among family members within a household. Therefore, ideally, each family member that shares the printer should perform member registration using a different username (in other words, his or her own username) in the case where that household is to utilize a membership-based service such as an online photo album, graphics printing, or the like.

However, because the conventional techniques can allocate only a single username to a single peripheral device to prevent the unauthorized use of the service by a third party, the individual family members who share the printer cannot perform member registration using their own usernames. As a result, when, for example, the family uses an online photo album service, there is a loss of privacy among the family members.

Furthermore, when a member attempts to log in to the membership-based service using a username created by another member, there are cases where the password set or re-set by that other member is not known, and thus the service, such as an online photo album, graphics printing, and so on cannot be used. In such a case, an easy password could conceivably be set so that the family members do not forget the password, but an easy password has a high probability of being discovered by a third party, this increases the possibility of the extremely serious problem of unauthorized use of the service by a third party.

Finally, when a peripheral device is transferred or resold, the former owner has already performed his or her member registration, therefore, unless that member registration is cancelled (deleted) prior to the peripheral device being transferred or resold, the new owner cannot perform his or her own member registration. The result is that the new owner, despite properly owning the peripheral device, cannot utilize the service.

SUMMARY OF THE INVENTION

The present invention provides a technique that enables multiple users to perform member registration using the information of a single peripheral device when the single peripheral device is shared by the multiple users, while also preventing the unauthorized use of a service.

According to one aspect of the present invention, there is provided a system, including a first information processing apparatus and a second information processing apparatus, that registers, in the second information processing apparatus, device information unique to a peripheral device capable of connecting to the first information processing apparatus, wherein the first information processing apparatus includes an obtainment unit configured to obtain the device information, a transmission unit configured to transmit the device information obtained by the obtainment unit to the second information processing apparatus, and an addition unit configured to add, to the device information, additional information indicating whether the device information was manually inputted to the first information processing apparatus in response to operations performed by a user or was automatically inputted to the first information processing apparatus by the peripheral device, and the second information processing apparatus includes a determination unit configured to determine whether or not the device information is already registered in a database in the case where information indicating that the device information transmitted by the transmission unit was manually inputted has been added to the device information, and a registration unit configured to register, in the database, device information to which has been added the information indicating the device information was automatically inputted, and device information to which the information indicating the device information was manually inputted has been added and that has been determined by the determination unit to not yet be registered in the database, in association with user information.

Further features of the present invention will become apparent from the following description of exemplary embodiments (with reference to the attached drawings).

BRIEF DESCRIPTION OF THE DRAWINGS

FIG. 9 is a diagram illustrating an example of a registered information update page of a company ABC, which provides a membership-based service.

FIGS. 13A to 13C are diagrams illustrating examples of device information control commands.

FIG. 14 is a diagram illustrating an example of a database for managing members of a membership-based service provided by a company ABC.

FIG. 16 is a diagram illustrating an example of a device addition failure page of a company ABC, which provides a membership-based service.

FIG. 21 is a diagram illustrating an example of a table expressing whether or not a device can be shared.

FIG. 24 is a diagram illustrating an example of a database for managing members of a membership-based service provided by a company ABC.

FIGS. 25A and 25B are examples of databases that manage the usage (usage status) of an online photo album and graphics printing, which are membership-based services of a company ABC.

FIG. 26 is a diagram illustrating the memory map of a storage medium that stores a program according to one aspect of the present invention.

DESCRIPTION OF THE EMBODIMENTS

Figure 1:
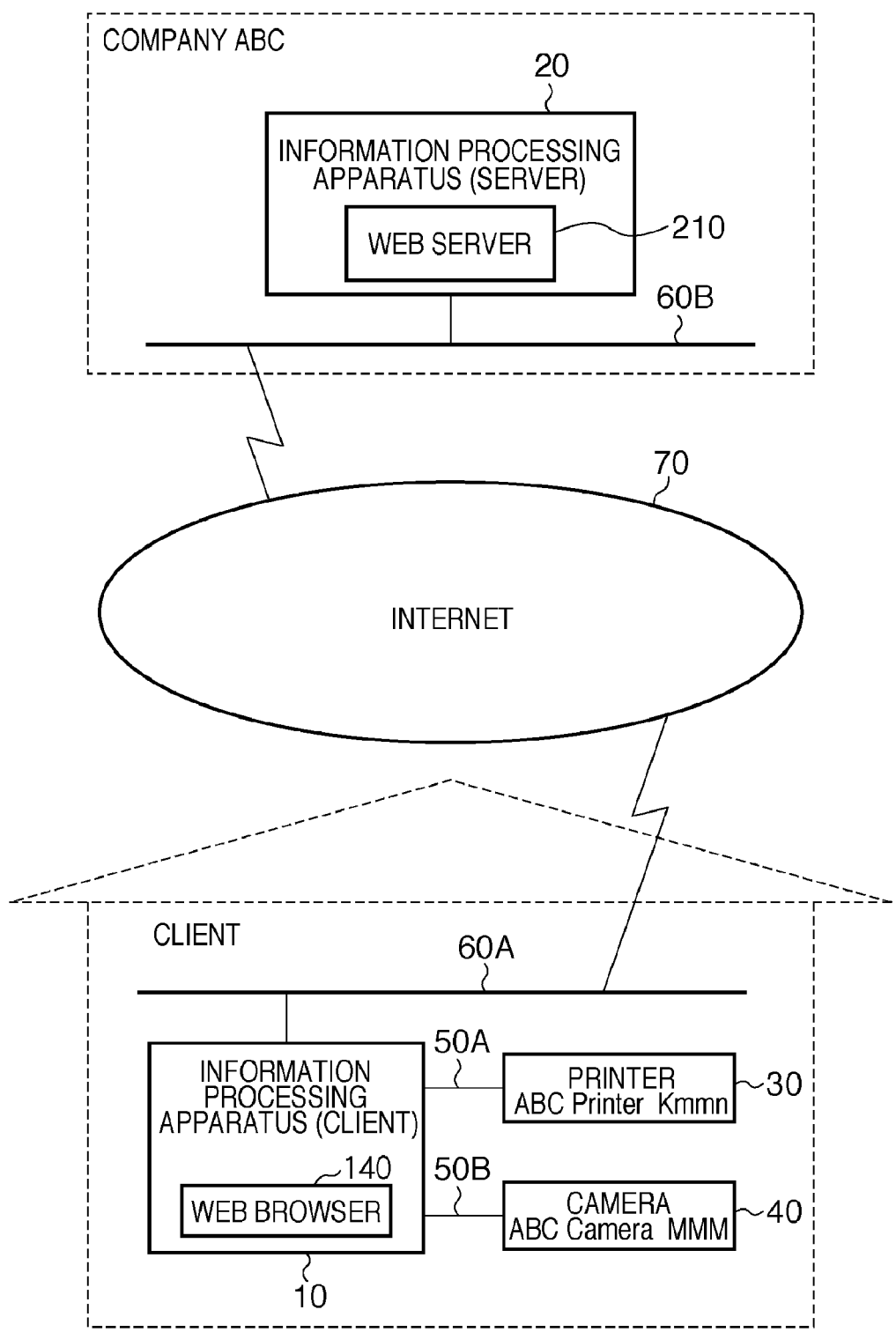
FIG. 1 is a schematic block diagram illustrating the configuration of a system according to one aspect of the present invention.

Hereinafter, preferred embodiments of the present invention shall be described with reference to the appended drawings. Note that in the drawings, identical constituent elements shall be given identical reference numerals, and redundant descriptions of items, such as processes related to the operations of identical buttons in a UI screen, shall be omitted.

<First Embodiment>

FIG. 1 is a schematic block diagram illustrating the configuration of a system 1 according to one aspect of the present invention. The system 1 includes an information processing apparatus 10 (a first information processing apparatus) and an information processing apparatus 20 (a second information processing apparatus), and registers unique information of a peripheral device (also called simply a "device") connectable to the information processing apparatus 10 in the information processing apparatus 20.

The information processing apparatuses 10 and 20 are configured of generic personal computers (PCs). The information processing apparatuses 10 and 20 each include the hardware shown in FIG. 2, and in the present embodiment, an OS (operating system) equivalent to Microsoft Corp.'s Windows Vista® is installed therein. The information processing apparatuses 10 and 20 are connected to networks 60A and 60B respectively, the networks being configured using Ethernet®. However, it should be noted that the information processing apparatuses 10 and 20 are not limited to PCs; any information processing apparatus, such as a DVD player, video game device, set top box, Internet-capable appliance, and so on can be used as the information processing apparatus 10 or 20. Likewise, the OS installed in the information processing apparatuses 10 and 20 is not limited to Windows Vista®; any OS that has similar functionality may be used. Finally, the networks 60A and 60B are not limited to Ethernet®, and may be configured using any network type.

A printer 30 is a peripheral device (also called simply a "device") such as a color inkjet printer, and in the present embodiment, is a printer made by a company ABC having a model name of "Printer Kmmn" and a serial number of "8888". The printer 30 includes the hardware shown in FIG. 3, and is connected to the information processing apparatus 10 via a USB connection 50A. The printer 30 is connected to the information processing apparatus 10 and is shared among family members (multiple users). Note, however, that the printer 30 is not limited to a color inkjet printer; any printer, such as a black-and-white laser printer, can be used.

A camera 40 is a peripheral device (also called simply a "device") such as a digital still camera or a digital video camera, and in the present embodiment, is a camera made by the company ABC having a model name of "Camera MMM" and a serial number of "1234". The camera 40 includes the hardware shown in FIG. 4, and is connected to the information processing apparatus 10 via a USB connection 50B.

Note that the printer 30 and the camera 40 are merely examples of peripheral devices, and can be replaced with, for example, copy machines, facsimile machines, scanners, mobile telephones, devices provided with a combination of such functions, or the like.

USB stands for Universal Serial Bus, and the USB connections 50A and 50B are interfaces that enable two-way communication. Therefore, in the present embodiment, the USB connection 50A enables two-way communication between the information processing apparatus 10 and the printer 30, whereas the USB connection 50B enables two-way communication between the information processing apparatus 10 and the camera 40. Note that the USB connections 50A and 50B can also be replaced with any interface that enables two-way communication between the information processing apparatus 10 and the printer 30/camera 40, such as Ethernet®, a wireless LAN, IEEE 1394, Bluetooth, or the like.

The network 60A is a generic home network installed in a household in which users (clients) that use the information processing apparatus 10, printer 30, and camera 40 live. The network 60B, meanwhile, is an office network installed at the company ABC.

The information processing apparatus 20 connected to the network 60B is a server provided with the functionality of a web server 210, and provides the website of the company ABC via the Internet 70. For example, the website provided by the information processing apparatus 20 (in other words, the web site of the company ABC) can be displayed and browsed in a web browser 140 of the information processing apparatus 10. The web browser 140 is an application structured as a Windows executable file (an .exe file). Accordingly, in the system 1, the information processing apparatus 10 functions as a client, whereas the information processing apparatus 20 functions as a server that provides predetermined information to the information processing apparatus 10.

Figure 2:
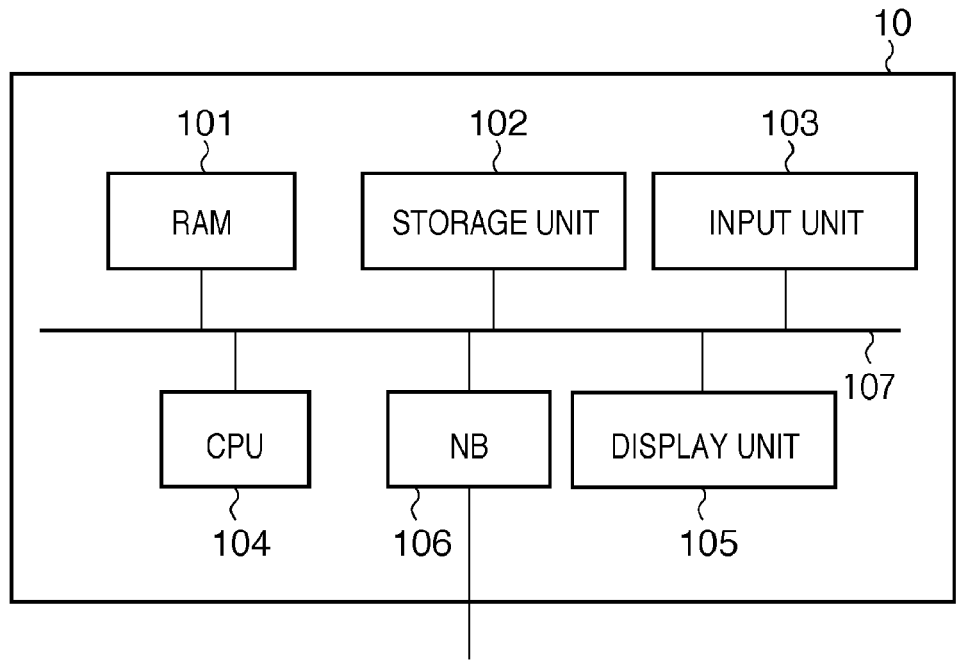
FIG. 2 is a schematic block diagram illustrating the hardware configuration of an information processing apparatus in the system shown in FIG. 1.

FIG. 2 is a schematic block diagram illustrating the hardware configuration of the information processing apparatus 10. As described above, because the information processing apparatuses 10 and 20 are configured of the same hardware, the present embodiment shall describe the hardware of the information processing apparatus 10 as a representative example.

As shown in FIG. 2, the information processing apparatus 10 includes a random access memory (RAM) 101, a storage unit 102 such as a hard disk (HDD), a portable CD-ROM, or internal ROM, and an input unit 103 such as a mouse, a keyboard, and the like. The information processing apparatus 10 further includes a central processing unit (CPU) 104 serving as a control unit, a display unit 105 such as a liquid-crystal display, and a network board (NB) 106 serving as a communication control unit. The RAM 101, storage unit 102, input unit 103, CPU 104, display unit 105, and NB 106 are connected to one another by a bus 107.

The various modules (software) of the information processing apparatus 10 are stored in the storage unit 102, loaded into the RAM 101 as necessary, and executed by the CPU 104, which is configured of a microprocessor or the like. To rephrase, the CPU 104 realizes the functionality of the various modules (software) of the information processing apparatus 10. The NB 106, meanwhile, includes a USB port for the USB connections 50A and 50B, an Ethernet port for the network 60A, and the like, and controls the communication carried out over the USB connections 50A and 50B, the network 60A, and so on.

Figure 3:
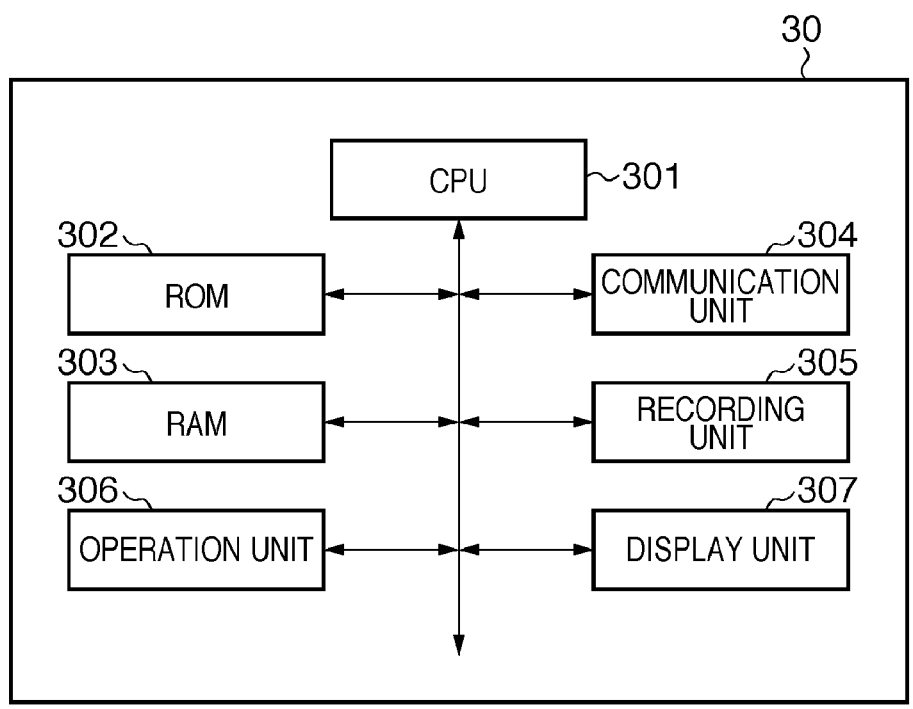
FIG. 3 is a schematic block diagram illustrating the hardware configuration of a printer in the system shown in FIG. 1.

FIG. 3 is a schematic block diagram illustrating the hardware configuration of the printer 30. As shown in FIG. 3, the printer 30 includes a central processing unit (CPU) 301, a ROM 302, a RAM 303, a communication unit 304, a recording unit 305, an operation unit 306, and a display unit 307. Note that in FIG. 3, the arrows indicate an address/data bus.

The CPU 301 controls the RAM 303, communication unit 304, recording unit 305, operation unit 306, and display unit 307 in accordance with programs stored in the ROM 302.

The ROM 302 stores programs for executing recording (printing) processing of the printer 30, processing for notifying the information processing apparatus 10 of the status of the printer 30, and so on.

The RAM 303 mainly serves to temporarily store recording data (print data) sent from the information processing apparatus 10, or in other words, recording data to be recorded (printed) by the recording unit 305.

The communication unit 304 includes a USB port for the USB connection 50A, and controls the communication carried out over the USB connection 50A.

The recording unit 305 includes a recording unit having, for example, an inkjet-type recording head, various color inks, a carriage, and a conveyance mechanism for recording paper, and an electric circuit having an ASIC that emits recording pulses based on the recording data.

The operation unit 306 includes various types of buttons, such as a power button, a reset button, and so on, and is used by a user when operating the printer 30.

The display unit 307 is configured of, for example, a touch panel-type liquid-crystal display, and displays the status of the printer 30, various settings, and so on. Note that a user can enter various settings via the display unit 307.

The display content of a file (that is, image data) opened by an application capable of printing is temporarily stored in the storage unit 102 of the information processing apparatus 10 as a spool file in a device-independent data format. Spool files stored in the storage unit 102 are converted by a printer driver 120 (described later) into recording data (print data) containing control commands for the printer 30, and are then sent to the printer 30 via the USB connection 50A. Recording data (print data) received by the printer 30 is converted into recording pulses (printing pulses) by the recording unit 305, and printed onto recording paper.

Figure 4:
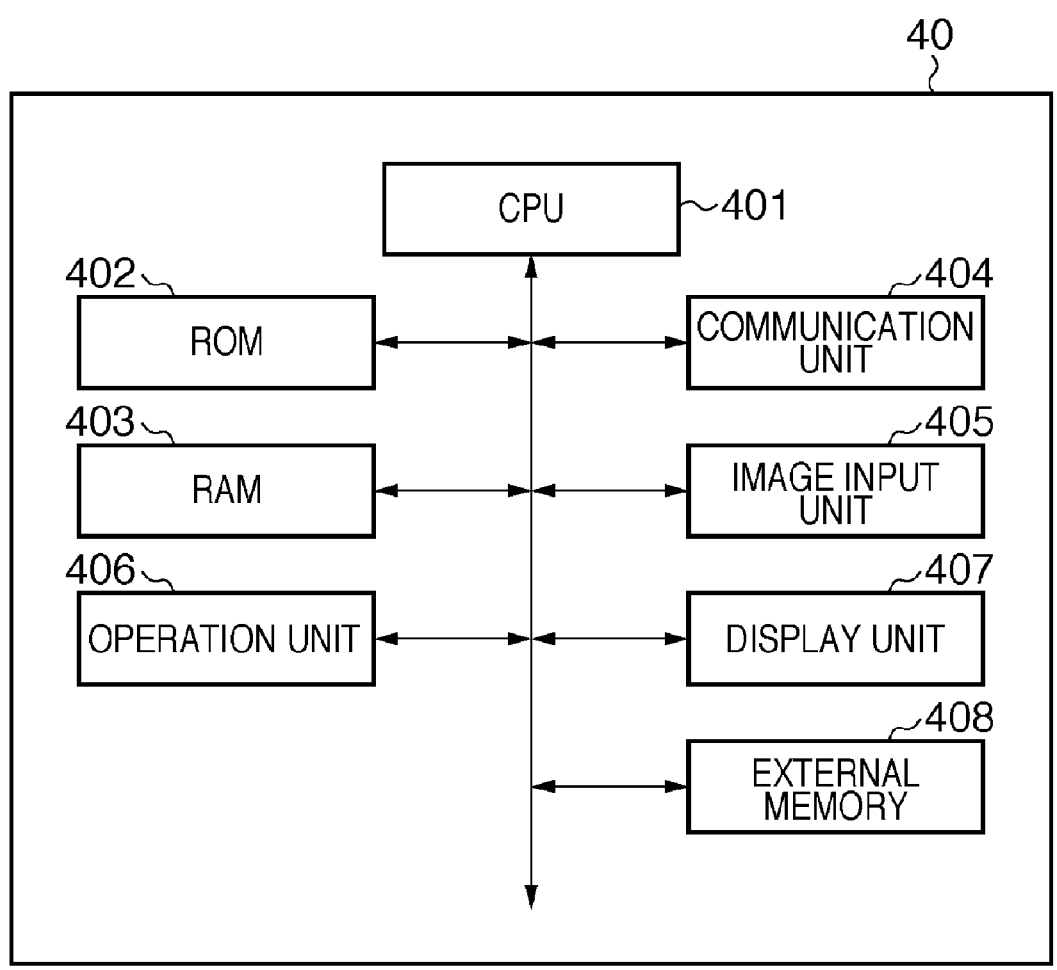
FIG. 4 is a schematic block diagram illustrating the hardware configuration of a camera in the system shown in FIG. 1.

FIG. 4 is a schematic block diagram illustrating the hardware configuration of the camera 40. As shown in FIG. 4, the camera 40 includes a central processing unit (CPU) 401, a ROM 402, a RAM 403, a communication unit 404, an image input unit 405, an operation unit 406, a display unit 407, and an external memory 408. As before, note that in FIG. 4, the arrows indicate an address/data bus.

The CPU 401 controls the RAM 403, communication unit 404, image input unit 405, operation unit 406, display unit 407, and external memory 408 in accordance with programs stored in the ROM 402.

The ROM 402 stores programs for executing imaging processing on a subject, operational processing for files in the external memory 408 connected to the camera 40 (that is, writing and reading out files), and so on.

The RAM 403 temporarily stores image data and the like expanded during image processing.

The communication unit 404 includes a USB port for the USB connection 50B, and controls the communication carried out over the USB connection 50B.

The image input unit 405 includes an optical unit provided with a zoom lens and an electric circuit having a CCD, an ASIC for image processing, and so on.

The operation unit 406 includes various types of buttons, such as a power button, a shutter button, and so on, and is used by a user when operating the camera 40.

The display unit 407 is configured of, for example, a touch panel-type liquid-crystal display, and displays images that have been captured, the status of the camera 40, various settings, and so on. Note that a user can enter various settings via the display unit 407.

The external memory 408 is a removable memory connected to the camera 40. The external memory 408 includes, for example, an SD memory card as standardized by the SD Association, a connection unit for connecting the SD memory card, and an electric circuit for controlling the SD memory card.

When the camera 40 is connected to the information processing apparatus 10 via the USB connection 50B, the external memory 408 is detected by the OS as storage, and is associated with an OS-standard storage class driver. The camera 40 is controlled by the stated storage class driver. Note that because the OS-standard storage class driver is technology known to those skilled in the art, detailed descriptions thereof shall be omitted.

Figure 5:
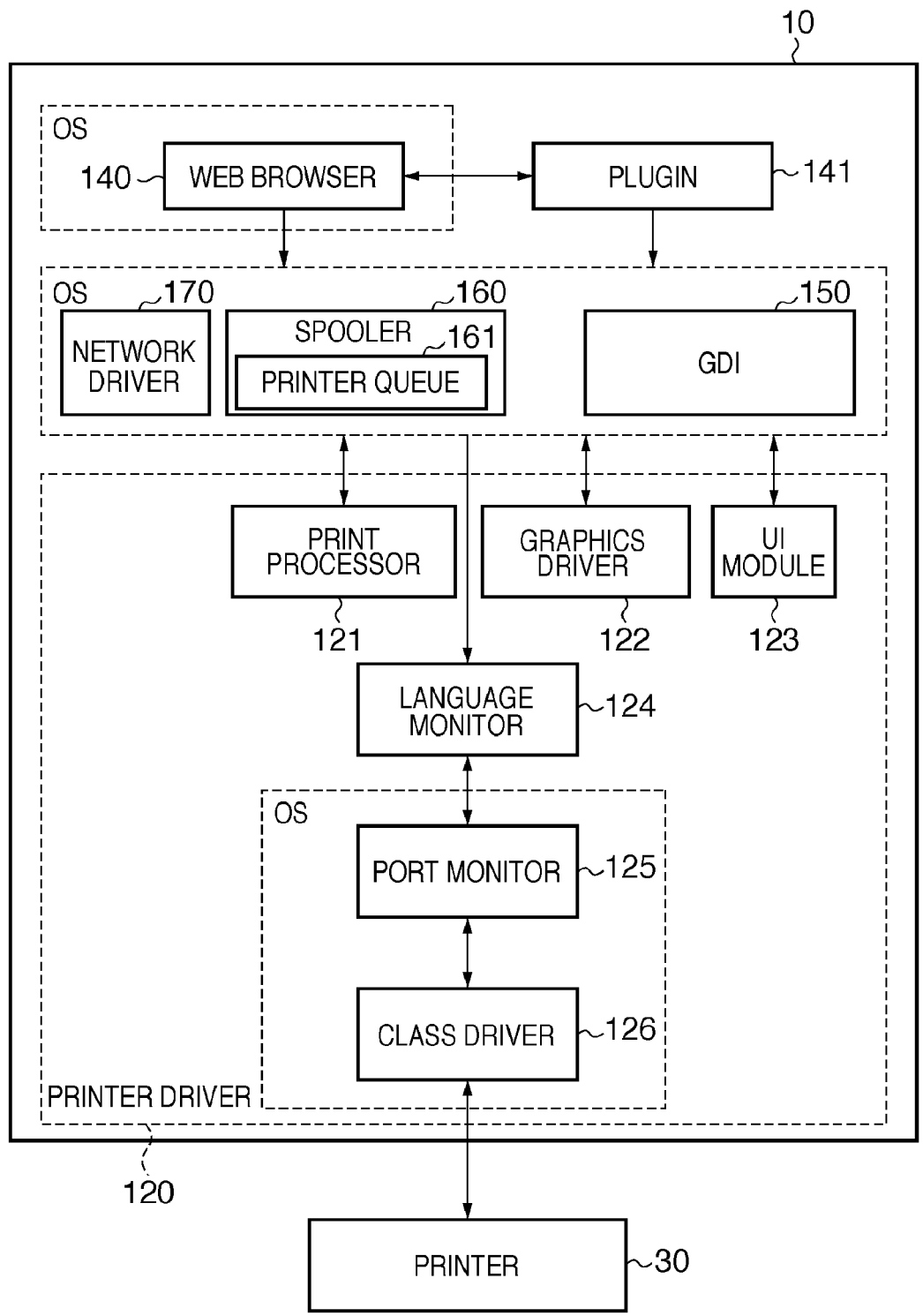
FIG. 5 is a schematic block diagram illustrating the configuration of a printer driver in an information processing apparatus in the system shown in FIG. 1.

FIG. 5 is a schematic block diagram illustrating the configuration of the printer driver 120 of the information processing apparatus 10. The printer driver 120 is a driver for the printer 30 installed in the information processing apparatus 10, and is configured of multiple modules, which shall be described later. In the present embodiment, the printer driver 120 is produced by the company ABC, which also manufactures the printer 30.

The web browser 140 is an application capable of printing. A plugin 141 is an item used to customize the functions of the web browser 140. In the present embodiment, using the plugin 141 makes it possible to customize the web browser 140 for a device manufactured by the company ABC, such as the printer 30 or the camera 40.

In FIG. 5, a graphics device interface (GDI) 150 is part of the OS. A printer queue 161 is configured as part of a spooler 160, and print jobs are queued therein. Print jobs that have been queued are displayed in a printer queue folder.

A network driver 170 is part of the OS. The network driver 170 is connected to the information processing apparatus 20 via the NB 106 and the Internet 70.

The multiple modules of which the printer driver 120 is configured shall be described next. A print processor 121 performs processing for changing the print layout, special processing on print images, and so on. As the core of the image processing of the printer driver 120, a graphics driver 122 performs image processing for printing based on rendering commands sent from the GDI 150, and generates print control commands. A UI module 123 provides and controls a user interface of the printer driver 120. A language monitor 124 serves as a data communication interface (I/F), controlling the transmission/reception of data. A port monitor 125 performs transmission processing for transmitting data sent from the language monitor 124 to the appropriate port, reception processing for receiving data sent from the printer 30 via a class driver 126, and so on. The class driver 126 is a low-level module closest to the port, and corresponds, in the present embodiment, to a printer class driver of the USB connection 50A, controlling the port (the USB port).

Figure 6:
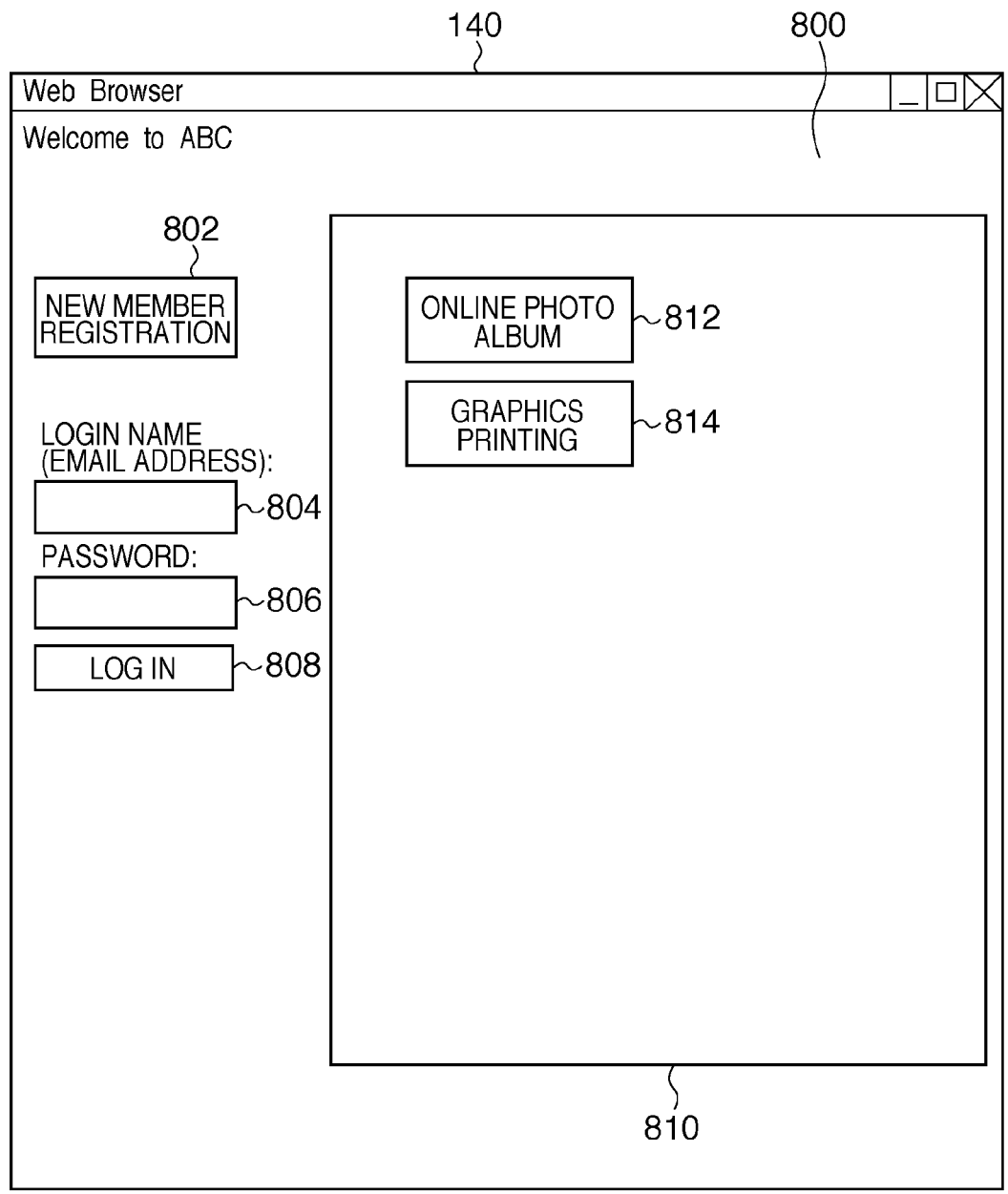
FIG. 6 is a diagram illustrating an example of the main page of a portal site of a company ABC, which provides a membership-based service.

FIG. 6 is a diagram illustrating an example of a main page 800 of a portal site of the company ABC, which provides a membership-based service. The main page 800 is displayed in the display unit 105 by the web browser 140 of the information processing apparatus 10, and shows a state prior to a user who has completed member registration (that is, a member) logging in. However, users who have not yet completed member registration (that is, non-members) can also display the main page 800. In the present embodiment, the portal site of the company ABC is provided as a membership-based service for online photo albums and graphics printing. Users who have completed member registration can access a members-only main page 900, illustrated in FIG. 7, by logging in through the main page 800, and can therefore make use of the online photo album and graphics printing services.

A member registration process, described later, is commenced upon a new member registration button 802, shown in FIG. 6, being pressed (selected).

A user who has completed member registration (a member) can log in to the membership-based service by entering his or her login name and password into a login name input field 804 and a password input field 806, respectively, and pressing (selecting) a login button 808. When the login button 808 is pressed (selected) and the login succeeds, the members-only main page 900 illustrated in FIG. 7 is displayed.

The membership-based services provided by the company ABC through the portal site are displayed in a content display area 810.

An online photo album start button 812 is a button for instructing the start of the online photo album service. A graphics printing start button 814 is a button for instructing the start of the graphics printing service. It should be noted that in the state shown in FIG. 6 (the main page 800), the user is not logged in to the membership-based service, and thus if the user presses (selects) the online photo album start button 812 or the graphics printing start button 814 in this state, a page prompting the user to enter his or her login name and password and log in to the membership-based service is displayed.

Figure 7:
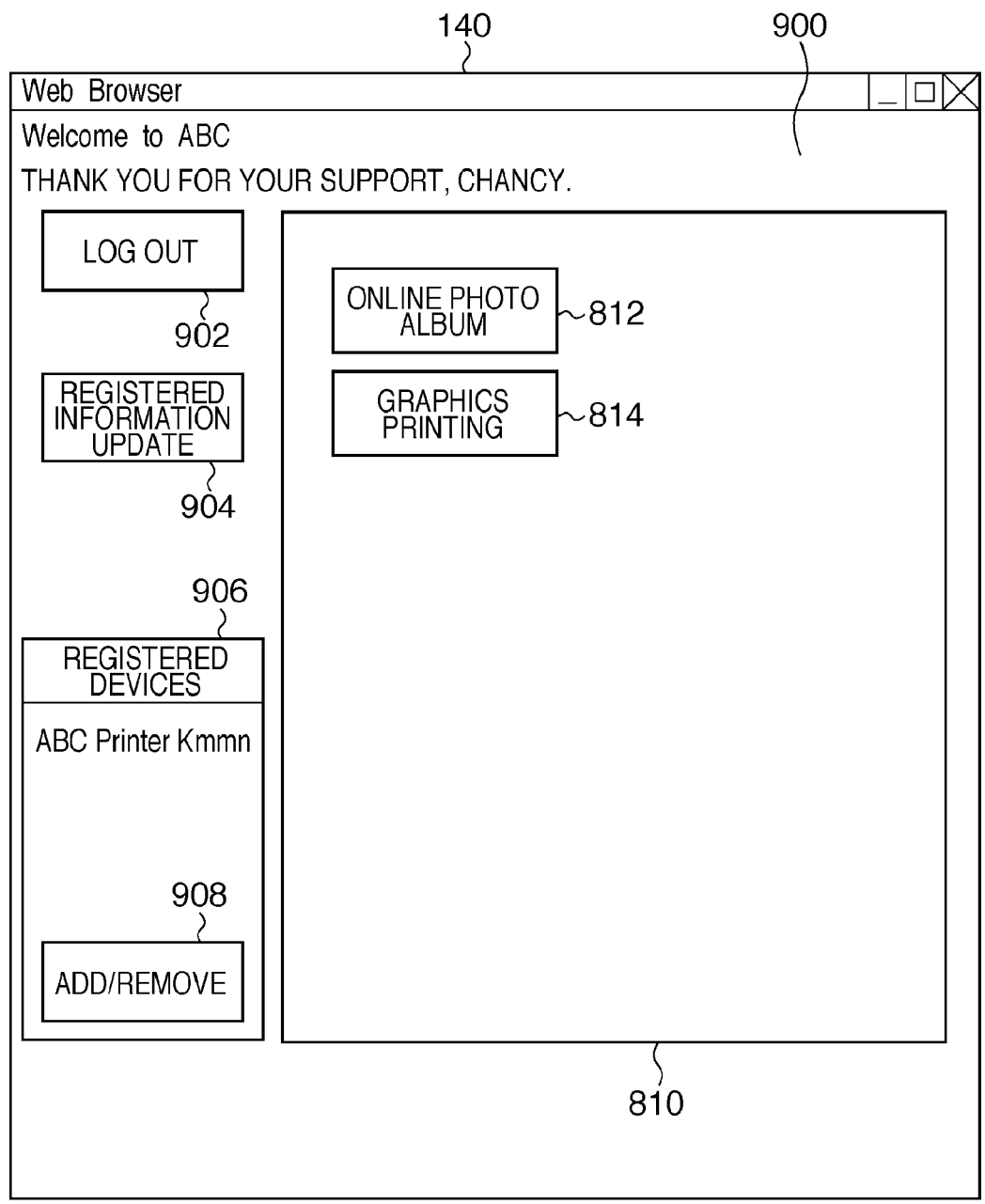
FIG. 7 is a diagram illustrating an example of a members-only main page of a portal site of a company ABC, which provides a membership-based service.

FIG. 7 is a diagram illustrating an example of the members-only main page 900 of the portal site of the company ABC, which provides a membership-based service. The main page 900 is displayed in the display unit 105 by the web browser 140 of the information processing apparatus 10, and shows a state following a user who has completed member registration (that is, a member) logging in.

A user who has logged in to the membership-based service (a member) can log out from the membership-based service by pressing (selecting) a logout button 902.

A registered information update page 1200, illustrated in FIG. 9, is displayed when a registered information update button 904 is pressed (selected).

Devices registered during new member registration or a registered information update (device information) are displayed in a registered device display area 906. When a user who has completed member registration (a member) has registered multiple devices, all the registered devices (device information) are displayed in the registered device display area 906.

An add/remove button 908 is a button for instructing the addition (registration) or removal of devices. The registered information update page 1200, illustrated in FIG. 9, is displayed when the add/remove button 908 is pressed (selected). The registered information update page 1200 mainly serves to allow users to add (register) new devices (device information), remove devices (device information) that have been registered but are no longer needed, and so on.

Figure 10:
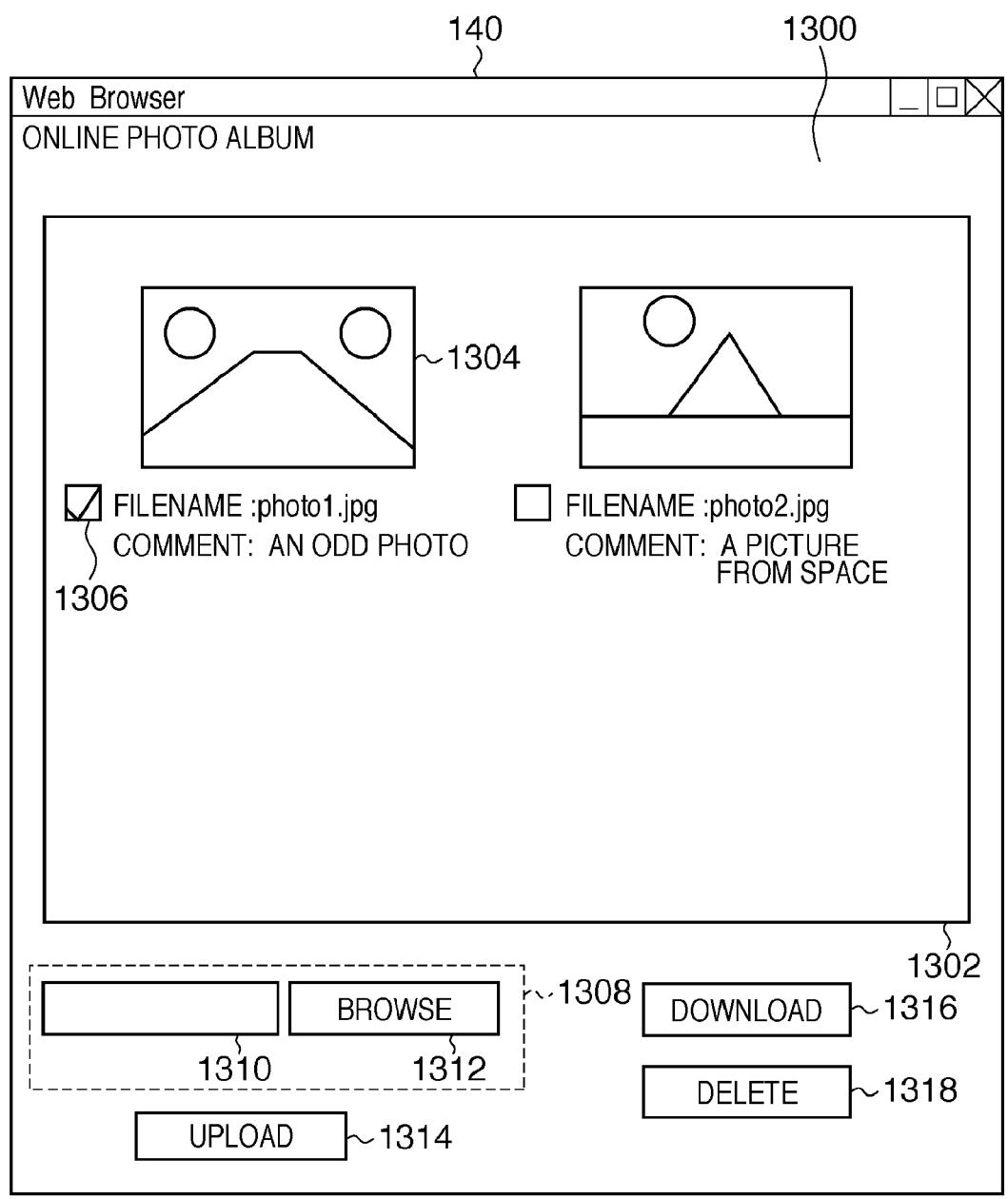
FIG. 10 is a diagram illustrating an example of a page of an online photo album service (an online photo album page), which is an example of a membership-based service provided by a company ABC.
Figure 11:
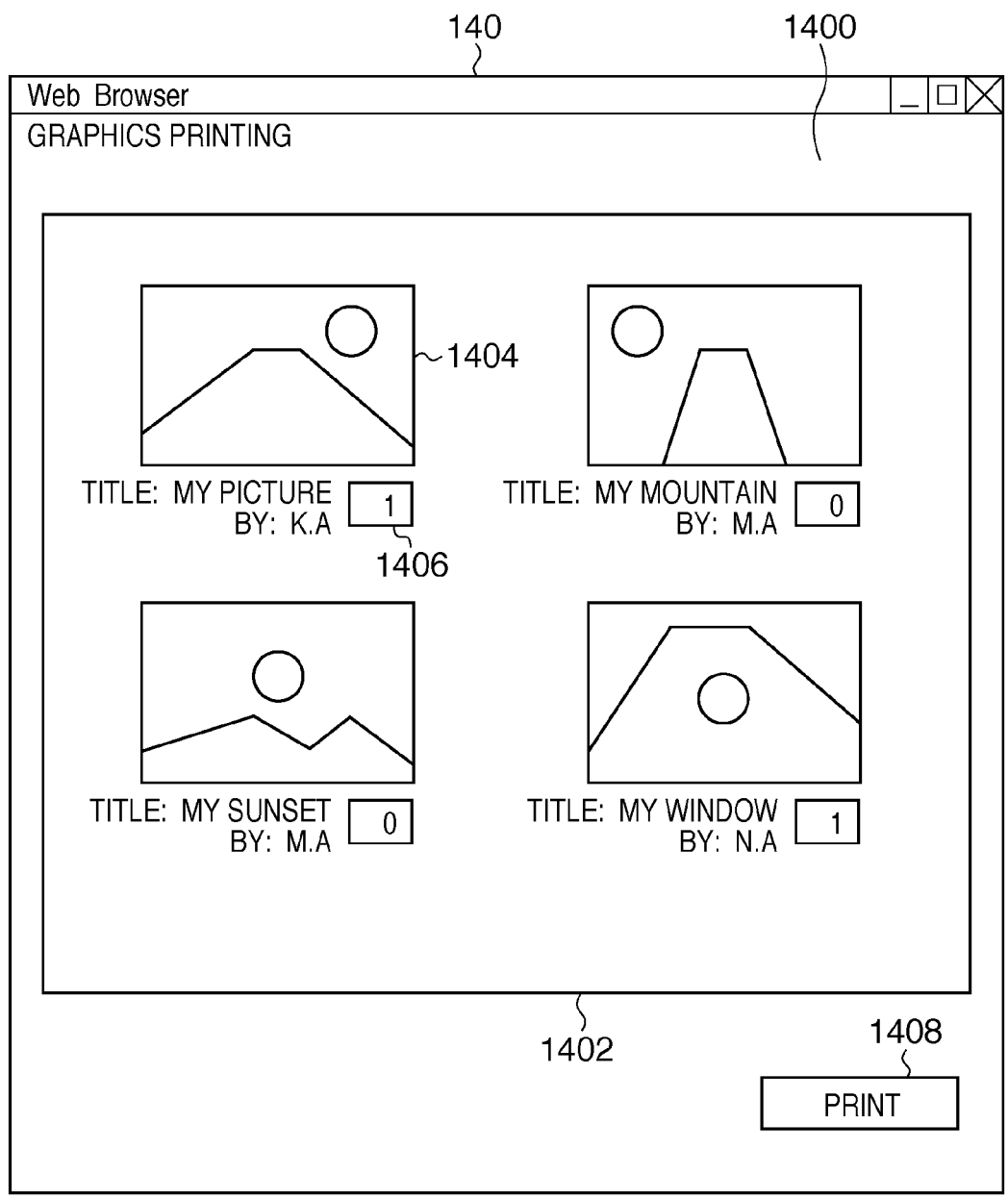
FIG. 11 is a diagram illustrating an example of a page of a graphics printing service (a graphics printing page), which is an example of a membership-based service provided by a company ABC.

It should be noted that in the state shown in FIG. 7 (the main page 900), the user is logged in to the membership-based service, and thus if the user presses (selects) the online photo album start button 812 in this state, an online photo album page 1300, illustrated in FIG. 10, is displayed. Meanwhile, a graphics printing page 1400, illustrated in FIG. 11, is displayed when the graphics printing start button 814 is pressed (selected).

Figure 8:
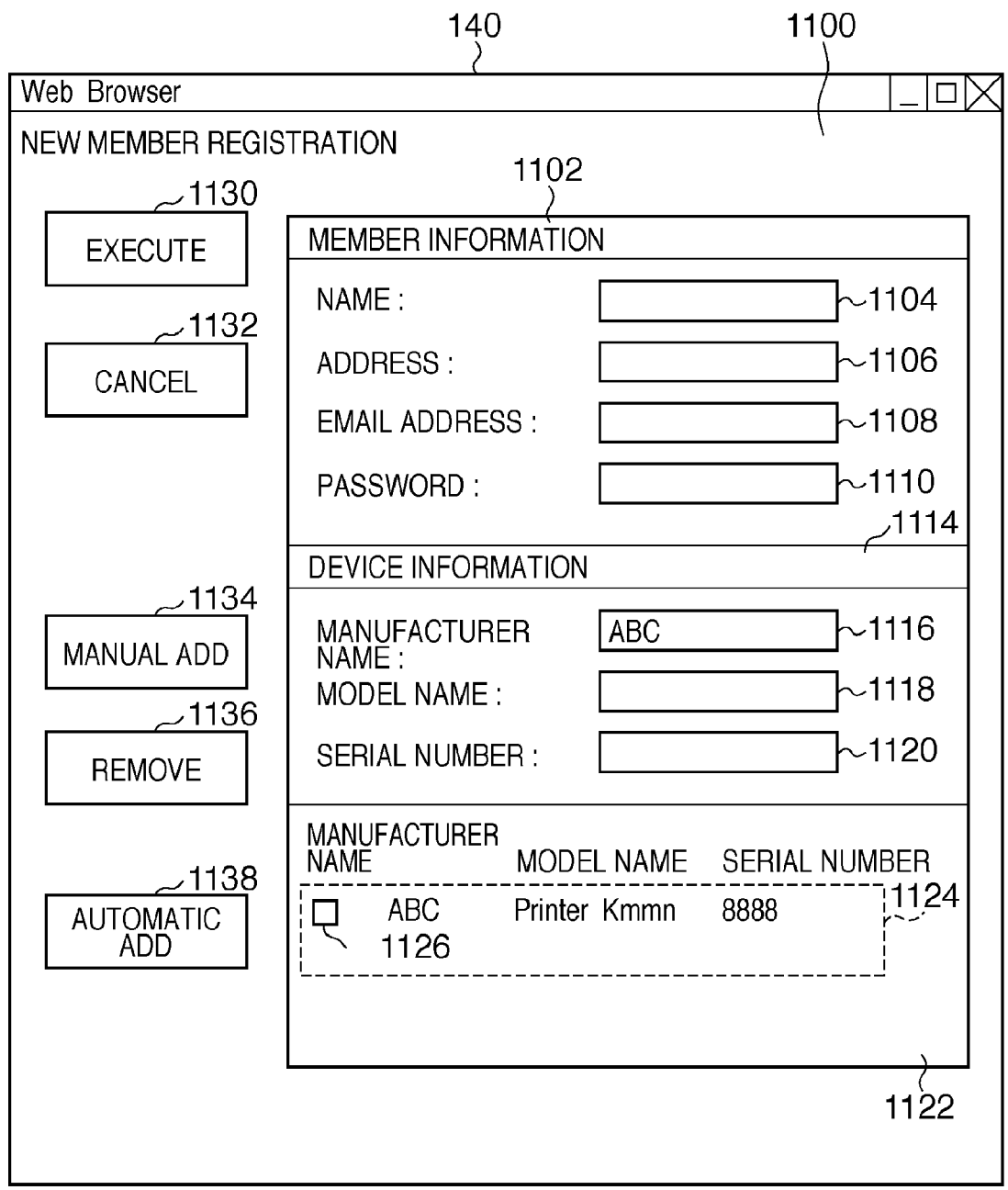
FIG. 8 is a diagram illustrating an example of a new member registration page of a company ABC, which provides a membership-based service.

FIG. 8 is a diagram illustrating an example of a new member registration page 1100 of the company ABC, which provides a membership-based service. The new member registration page 1100 is displayed in the display unit 105 by the web browser 140 of the information processing apparatus 10. Users who have not completed member registration (non-members) can perform new member registration for the membership-based service through the new member registration page 1100. The new member registration page 1100 displays member information, which is unique information for the member (user), and device information, which is unique information for the device, as member registration information (new member registration information).

A member information display area 1102 includes a name input field 1104, an address input field 1106, an email address input field 1108, and a password input field 1110, each of which is filled out by the user. Note that in the present embodiment, the email address entered into the email address input field 1108 serves as the user's login name after member registration has been completed.

A device information display field 1114 includes at least a manufacturer name input field 1116, a model name input field 1118, a serial number input field 1120, and a device display area 1122.

Devices that have been added (registered) (device information) are displayed in the device display area 1122. When multiple devices (device information) have been added (registered), all the devices (device information) that have been added (registered) are displayed in the device display area 1122. A device that has been added (registered) (device information) is displayed in the device display area 1122 as a device display 1124, which includes a selection check box 1126. Checking the selection check box 1126 makes it possible to select the device (device information) in the device display 1124. Note that FIG. 8 illustrates a state in which the selection check box 1126 is not checked, or in other words, a state in which the device (device information) in the device display 1124 is not selected.

Figure 17:
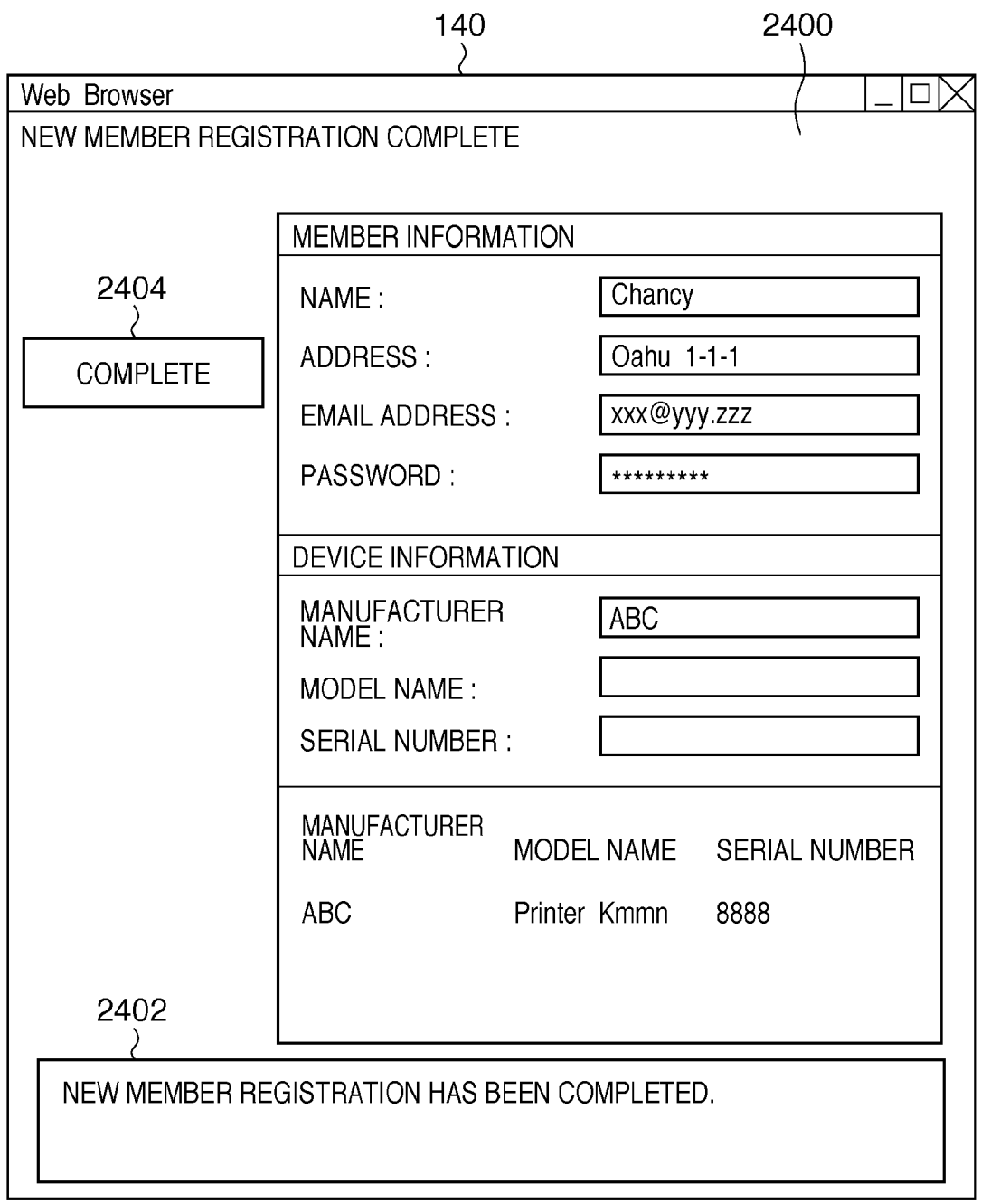
FIG. 17 is a diagram illustrating an example of a new member registration complete page of a company ABC, which provides a membership-based service.

When a new member registration execute button 1130, shown in FIG. 8, has been pressed (selected), the new member registration is executed using the information entered (displayed) in the new member registration page 1100. If the new member registration is complete (successful), a new member registration complete page 2400, illustrated in FIG. 17, is displayed. However, if the new member registration fails, the display reverts to the new member registration page 1100, with the errant input fields highlighted.

When a cancel button 1132 is pressed (selected), the new member registration is cancelled, and the main page 800, illustrated in FIG. 6, is displayed.

A manual add button 1134 is a button with which a user adds a device manually. When the manual add button 1134 is pressed (selected), a device (device information) is added (registered) using data entered by the user in the manufacturer name input field 1116, model name input field 1118, and serial number input field 1120. Note that when the manual add button 1134 is pressed, information indicating that the manual add button 1134 has been pressed (that is, that the device information has been obtained in response to user operations) is added to the device information transmitted to the information processing apparatus 20.

When a remove button 1136 is pressed (selected), the device (device information) corresponding to the device display 1124 selected using the selection check box 1126 is removed.

An automatic add button 1138 is a button for adding a device automatically. When the automatic add button 1138 is pressed (selected) while the device (the printer 30, camera 40, or the like) is connected to the information processing apparatus 10, the device (device information) connected to the information processing apparatus 10 is automatically obtained and added (registered). When the automatic addition of the device (device information) has ended (succeeded), that device (device information) is added to the device display area 1122 and displayed. Note that when the automatic add button 1138 is pressed, information indicating that the automatic add button 1138 has been pressed (that is, that the device information has been obtained automatically by connecting the device) is added to the device information transmitted to the information processing apparatus 20.

FIG. 9 is a diagram illustrating an example of the registered information update page 1200 of the company ABC, which provides a membership-based service. The registered information update page 1200 is displayed in the display unit 105 by the web browser 140 of the information processing apparatus 10. A user who has completed member registration (a member) can update the member registration information s/he registered with a membership-based service (member information and device information) through the registered information update page 1200.

Devices (device information) that have been registered or devices (device information) that have been added (registered) through the registered information update page 1200 are displayed in a device display area 1222.

FIG. 9 illustrates a state in which a selection check box 1230 is checked, or in other words, a state in which the device (device information) in a device display 1226 is selected.

When a registered information update execute button 1240 is pressed (selected), the same device registration process as that performed when the new member registration execute button 1130 is pressed (selected) is performed, and a message display area 2402, illustrated in FIG. 17, is displayed, showing a screen that has changed to a display indicating that the member registration information update is complete.

FIG. 10 is a diagram illustrating an example of a page of an online photo album service (an online photo album page) 1300, which is an example of a membership-based service provided by the company ABC. The online photo album page 1300 is displayed in the display unit 105 by the web browser 140 of the information processing apparatus 10. FIG. 10 illustrates a state in which the camera 40 is connected to the information processing apparatus 10 via the USB connection 50B.

Images (image files) 1304 saved in an online photo album reserved for members who have logged in to the membership-based service are displayed (listed) in an online photo album display area 1302.

Checking selection check boxes 1306 makes it possible to select the images 1304 displayed in the online photo album display area 1302.

An image selection area 1308 includes a file path display field 1310 and a file browse button 1312.

When the file browse button 1312 is pressed (selected), images in the path displayed in the file path display field 1310 (for example, images saved in the external memory 408 of the camera 40, images saved in the storage unit 102 of the information processing apparatus 10, and so on) can be selected.

When an upload button 1314 is pressed (selected), the images selected in the image selection area 1308 are uploaded to the online photo album, and are added to and displayed in the online photo album display area 1302.

Meanwhile, when a download button 1316 is pressed (selected), the images 1304 selected using the selection check boxes 1306 are downloaded. Images 1304 that are downloaded can, for example, be saved in the external memory 408 of the camera 40, the storage unit 102 of the information processing apparatus 10, and so on. Note that when multiple images are selected using the selection check boxes 1306, all of the selected images are downloaded.

When a delete button 1318 is pressed (selected), the images 1304 selected using the selection check boxes 1306 are deleted from the online photo album. Note that when multiple images are selected using the selection check boxes 1306, all of the selected images are deleted from the online photo album.

FIG. 11 is a diagram illustrating an example of a page of a graphics printing service (a graphics printing page) 1400, which is an example of a membership-based service provided by the company ABC. Graphics 1404 that can be printed by members who have logged in to the membership-based service are displayed (listed) in a graphics display area 1402.

The graphics printing page 1400 shown in FIG. 11 illustrates a state in which the printer 30 is connected to the information processing apparatus 10 via the USB connection 50A. Here, the configuration may be such that the graphics printing page 1400 is provided to and displayed in the information processing apparatus 10 only when the information processing apparatus 20 has been notified by the information processing apparatus 10 that the printer 30 is connected to the information processing apparatus 10 at that point in time. Doing so makes it possible to prevent users that do not own a printer at that point in time from logging in to and accessing the membership-based service using old registration information registered at a time when they did own a printer.

Print number specification fields 1406 specify the number of prints to be made of each graphic 1404.

When a print button 1408 is pressed (selected), the number (one or more) of graphics 1404 specified in the print number specification fields 1406 is printed. Note that when one or more prints are specified in the print number specification fields 1406 of multiple graphics 1404, all of the multiple graphics 1404 are printed.

Figure 12:
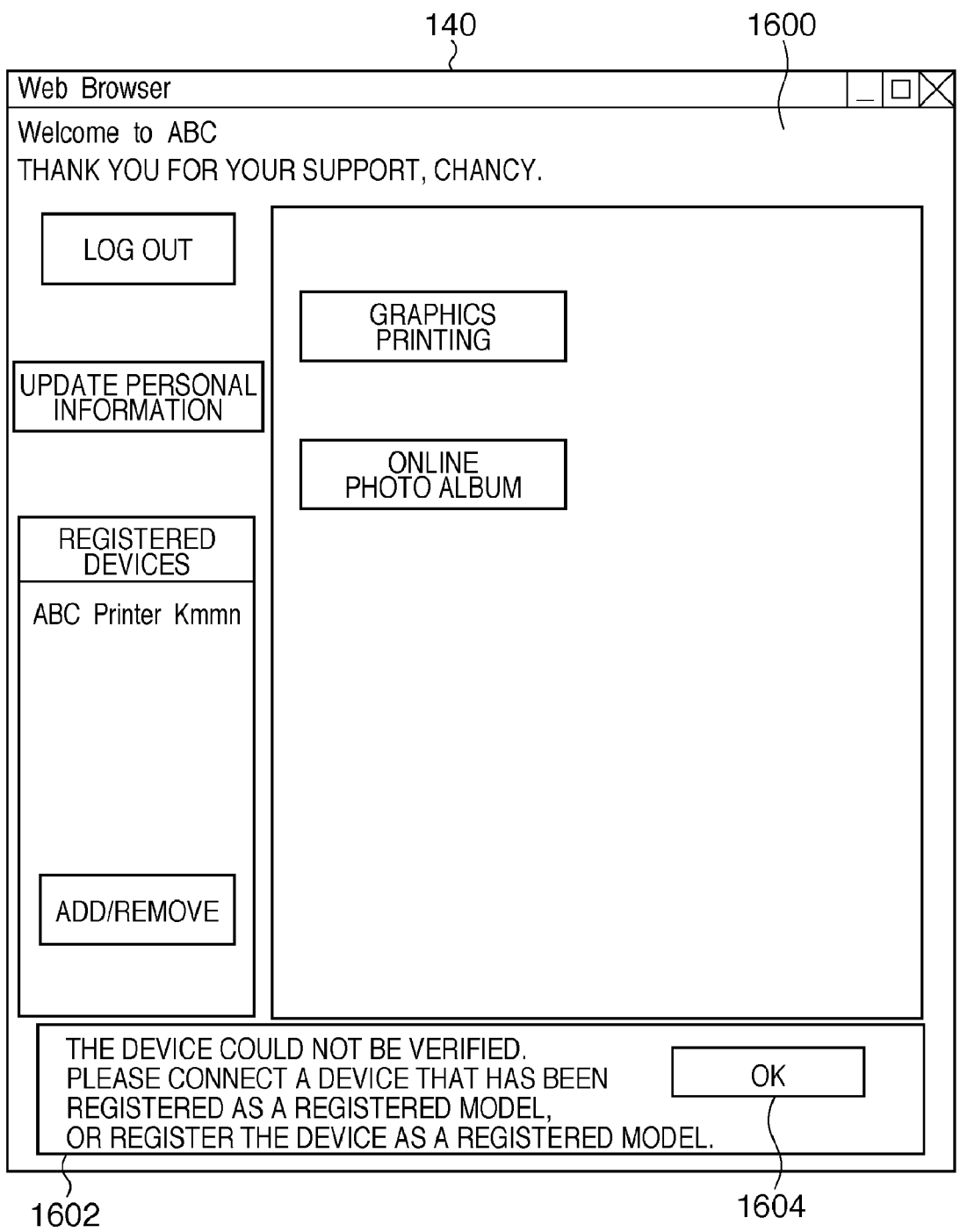
FIG. 12 is a diagram illustrating an example of a device verification error page of a company ABC, which provides a membership-based service.

FIG. 12 is a diagram illustrating an example of a device verification error page 1600 of the company ABC, which provides a membership-based service. The device verification error page 1600 is displayed in the display unit 105 by the web browser 140 of the information processing apparatus 10, and is displayed when a device not yet registered by a member is connected to the information processing apparatus 10 during the use of the membership-based service provided by the company ABC.

A message display area 1602 displays a notification that the device verification has failed (for example, "the device could not be verified"), information regarding how to address the problem (for example, "please connect a device that has been registered as a registered model, or register the device as a registered model"), and so on.

When an OK button 1604 is pressed (selected), the main page 900, illustrated in FIG. 7, is displayed.

FIGS. 13A to 13C are diagrams illustrating examples of device information control commands. FIG. 13A is a device information request command, and is a control command issued by the information processing apparatus 10 to the printer 30, the camera 40, or the like. FIG. 13B is a device information return command, and is a control command returned by the printer 30 to the information processing apparatus 10 when the printer 30 has received the device information request command, shown in FIG. 13A, from the information processing apparatus 10. Finally, FIG. 13C is a device information return command, and is a control command returned by the camera 40 to the information processing apparatus 10 when the camera 40 has received the device information request command, shown in FIG. 13A, from the information processing apparatus 10.

FIG. 14 is a diagram illustrating an example of a database 1800 for managing members of a membership-based service provided by the company ABC. The database 1800 is managed by the information processing apparatus 20, and associates the member information and device information of a user who has completed member registration (a member) with the name of that member. The member registration information of members utilizing a membership-based service of the company ABC, or "Chancy", "Mami", "Misachan", and "Natchan", is managed by the database 1800.

Figure 15A:
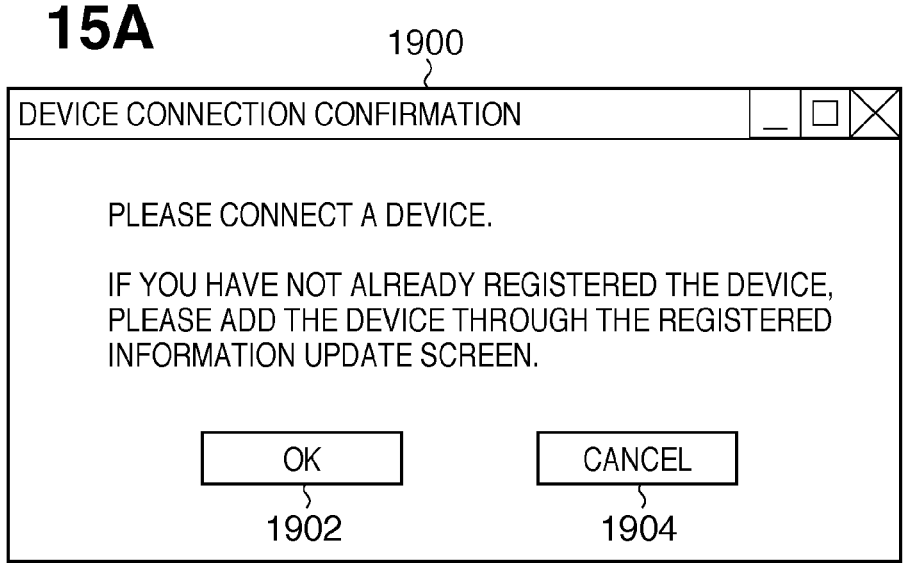
FIGS. 15A to 15C are diagrams illustrating examples of device connection confirmation messages.

FIG. 15A is a diagram illustrating an example of a device connection confirmation message 1900. The device connection confirmation message 1900 is displayed, through the plugin 141, upon the commencement of use of a membership-based service provided by the company ABC when a registered device is not connected to the information processing apparatus 10.

When an OK button 1902 is pressed (selected), the device connection confirmation message 1900 is closed and the connection status of the device is reconfirmed.

However, when a cancel button 1904 is pressed (selected), the device connection confirmation message 1900 is closed without reconfirming the connection status of the device.

Figure 15B:
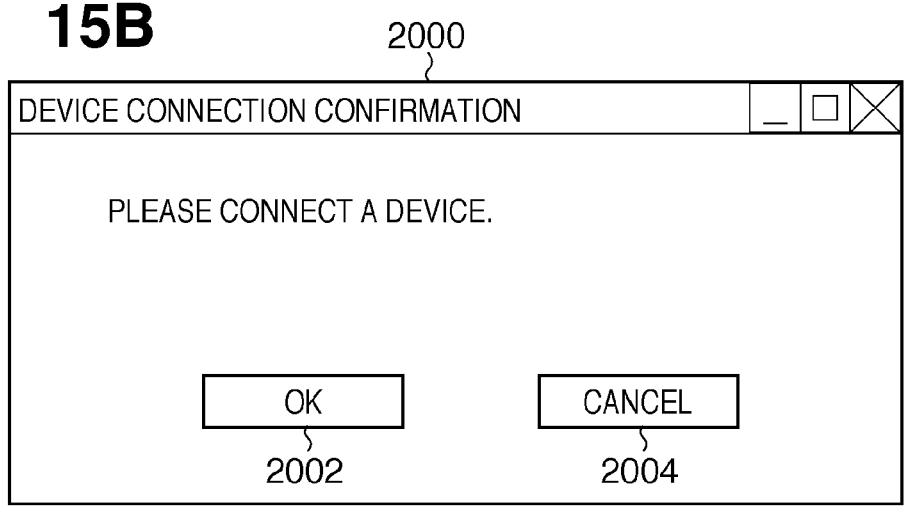

FIG. 15B is a diagram illustrating an example of a device connection confirmation message 2000. The device connection confirmation message 2000 is displayed, through the plugin 141, upon the automatic add button 1138 shown in FIG. 8 or the automatic add button shown in FIG. 9 being pressed (selected) when a device is not connected to the information processing apparatus 10.

When an OK button 2002 is pressed (selected), the device connection confirmation message 2000 is closed and the connection status of the device is reconfirmed.

However, when a cancel button 2004 is pressed (selected), the device connection confirmation message 2000 is closed without reconfirming the connection status of the device.

Figure 15C:
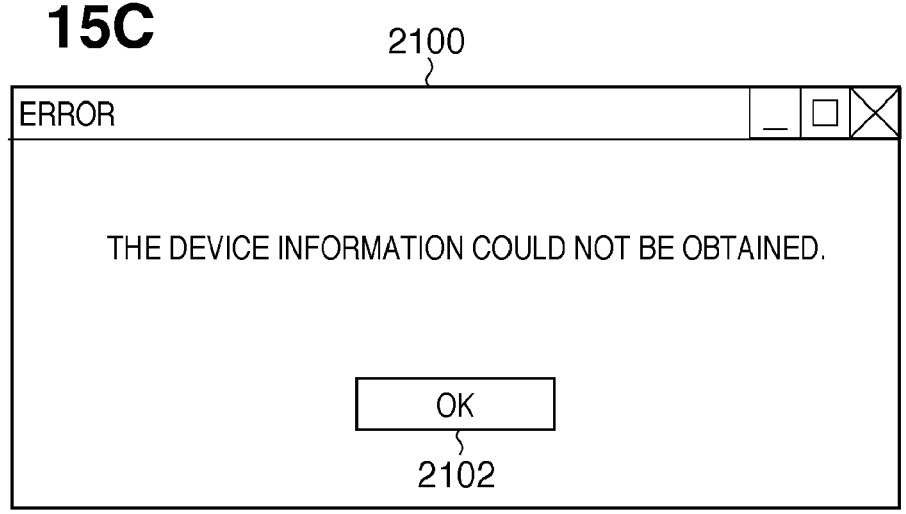

FIG. 15C is a diagram illustrating an example of a device information obtainment failure message 2100. The device information obtainment failure message 2100 is displayed in through the plugin 141 when the obtainment of device information has failed.

When an OK button 2102 is pressed (selected), the device information obtainment failure message 2100 is closed.

FIG. 16 is a diagram illustrating an example of a device addition failure page 2200 of the company ABC, which provides a membership-based service. This page is displayed at the time of new member registration when the manual addition of a device has failed.

A notification indicating that the manual addition of the device has failed (for example, "the device 'ABC Camera KKK, Serial Number 777' cannot be added manually because it is already registered") is displayed in a message display area 2202. Furthermore, information regarding how to address the problem (for example, "please recheck the device information and manually add the device, or connect the device and wait for it to be automatically added") is also displayed in the message display area 2202.

FIG. 17 is a diagram illustrating an example of a new member registration complete page 2400 of the company ABC, which provides a membership-based service. The new member registration complete page 2400 is displayed in the display unit 105 by the web browser 140 of the information processing apparatus 10 when new member registration has been completed.

A notification that the new member registration has been completed (for example, "new member registration is complete") is displayed in a message display area 2402. Note that the same screen is displayed when a registered information update is completed, and a notification indicating that the member registration update has been completed is displayed in the message display area 2402.

When a complete button 2404 is pressed (selected), the main page 900, illustrated in FIG. 7, is displayed.

Figure 18:
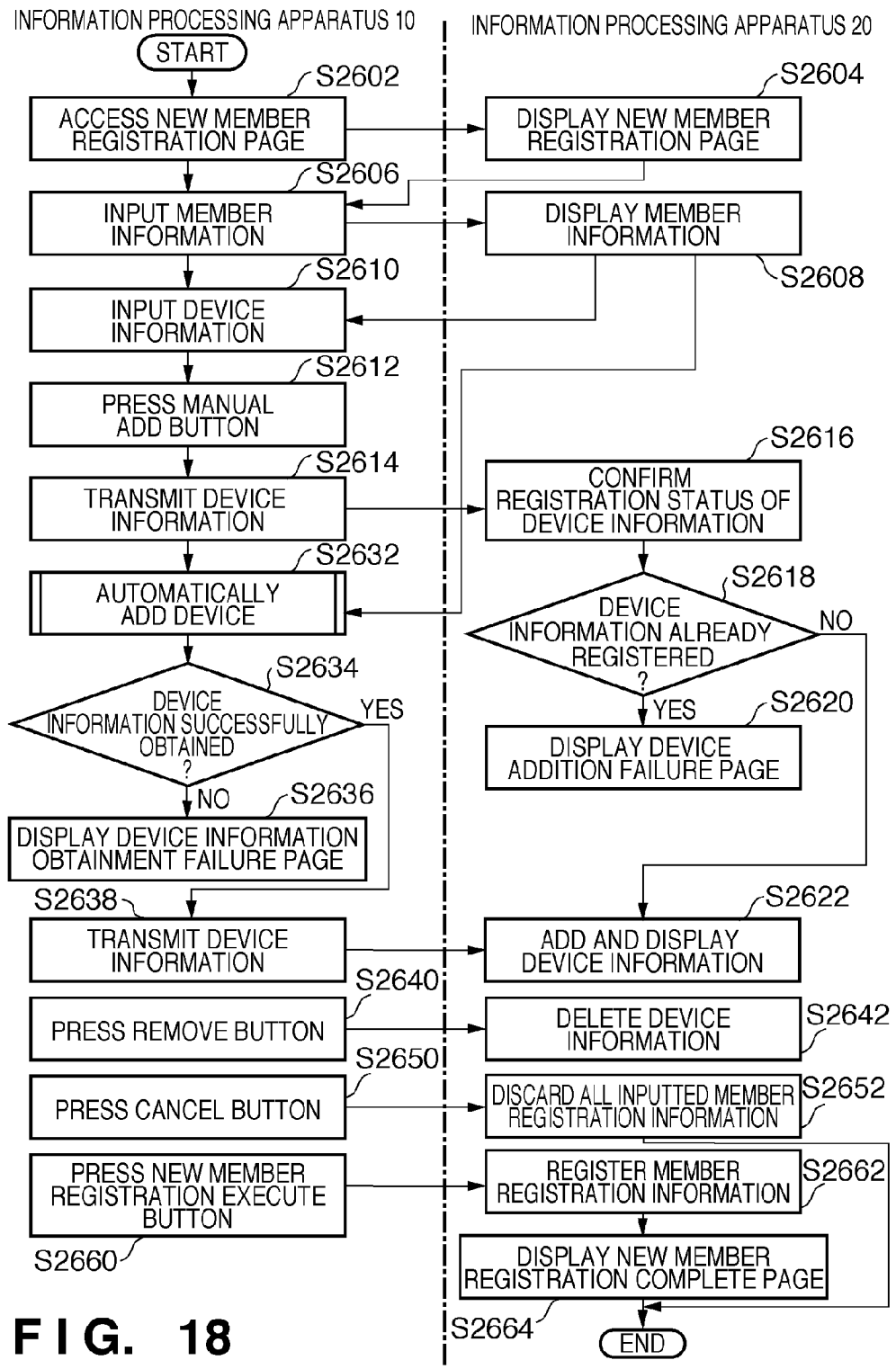
FIG. 18 is a flowchart illustrating processing, performed in the system shown in FIG. 1, for new member registration or a registered member information update for a membership-based service provided by a company ABC.

Hereinafter, the processing for registering as a new member with a membership-based service provided by the company ABC, performed in the system 1, shall be described with reference to FIG. 18. The new member registration process shown in FIG. 18 is started when the new member registration button 802 is pressed in the main page 800 shown in FIG. 6.

First, when the information processing apparatus (client) 10 accesses the URL of the service in question (S2602), the web server 210 of the information processing apparatus (server) 20 operates, and the new member registration page 1100 shown in FIG. 8 is displayed (S2604).

The user then enters his or her membership information in the various input fields of the member information display area 1102 in the new member registration page 1100, using the information processing apparatus 10 (S2606). The entered member information is set in the various input fields in the member information display area 1102 and is displayed (S2608). However, asterisks or the like may be displayed in the password input field 1110 rather than the actual characters of the password as entered. Furthermore, the input email address is also used as a user ID during the login authentication.

There are cases where the device information is manually input, and cases where the device information is automatically input. When the device information is manually input, the procedure advances to S2610, whereas when the device information is automatically input, the procedure advances to S2632.

First, when the user manually inputs the device information (S2610) and presses the manual add button 1134 (S2612) in the new member registration page 1100, the device information manually input through the operations performed by the user is transmitted from the information processing apparatus 10 to the information processing apparatus 20 (S2614). At this time, information indicating that the device information was obtained through manual input performed by the user is added to the device information. Note that in S2610, the device information is input into the manufacturer name input field 1116, the model name input field 1118, and the serial number input field 1120 by the user.

Having received the device information from the information processing apparatus 10, the information processing apparatus 20 refers to the database 1800 shown in FIG. 14 and confirms the registration status of that device information (S2616). To rephrase, it is determined whether or not the device information transmitted from the information processing apparatus 10 is already registered in the information processing apparatus 20 (that is, whether or not the information is present in the database 1800).

When the device information from the information processing apparatus 10 is already registered (is already present in the database 1800) (YES in S2618), the device addition failure page 2200 shown in FIG. 16 is displayed (S2620).

However, when the device information from the information processing apparatus 10 is not registered (is not present in the database 1800) (NO in S2618), that device information is added (registered). To be more specific, the device information from the information processing apparatus 10 is added (registered) in the device display area 1122 of the new member registration page 1100 shown in FIG. 8, and displayed (S2622).

However, when the automatic add button 1138 in the new member registration page 1100 is pressed, a process for automatically adding a device is executed by the plugin 141 of the information processing apparatus 10 (S2632). The process for automatically adding a device shall be described in detail later.

When the plugin 141 of the information processing apparatus 10 has failed to automatically obtain the device information (NO in S2634), the device information obtainment failure message 2100 shown in FIG. 15C is displayed (S2636).

When, however, the plugin 141 of the information processing apparatus 10 has succeeded in automatically obtaining the device information (YES in S2634), that device information is transmitted from the information processing apparatus 10 to the information processing apparatus 20 (S2638). At this time, information indicating that the device information was automatically obtained as a result of the device being connected is added to the device information. It is thus possible for the information processing apparatus 20 to determine whether the device information transmitted from the information processing apparatus 10 was obtained through input performed by a user or obtained automatically as a result of the device being connected, from the device information itself.

Having received the device information from the information processing apparatus 10, the information processing apparatus 20 adds (registers) the device information to the device display area 1122 of the new member registration page 1100, shown in FIG. 8, and displays the information (S2622). Here, when the device information has been automatically input, a process for determining whether or not the device information is already registered is not performed, unlike the abovementioned case of manual input (S2618). In this manner, in the present embodiment, when the device information has been automatically input, the same device information is permitted to registered in an overlapping manner, whereas when the device information has been manually input, the same device information is prohibited from being registered in such an overlapping manner.

There are also cases where, in the new member registration page 1100, the remove button 1136 is pressed (S2640) when a selection check box 1126 is checked and a device (device information) of the device display 1124 is therefore selected. In such a case, the information processing apparatus 20 removes the device information of the device display 1124 whose selection check box 1126 is checked from the device display area 1122 in the new member registration page 1100 shown in FIG. 8 (S2642).

Furthermore, there are also cases where the cancel button 1132 is pressed in the new member registration page 1100 (S2650). In such a case, the information processing apparatus 20 discards all the member registration information (member information and device information) entered in the new member registration page 1100 (S2652), and the new member registration processing ends.

However, when, in the new member registration page 1100, the new member registration execute button 1130 is pressed (S2660), the information processing apparatus 20 registers the member registration information entered into the new member registration page 1100 in the database 1800 (S2662). The new member registration complete page 2400 shown in FIG. 17 is then displayed (S2664), and the new member registration processing ends.

Figure 19:
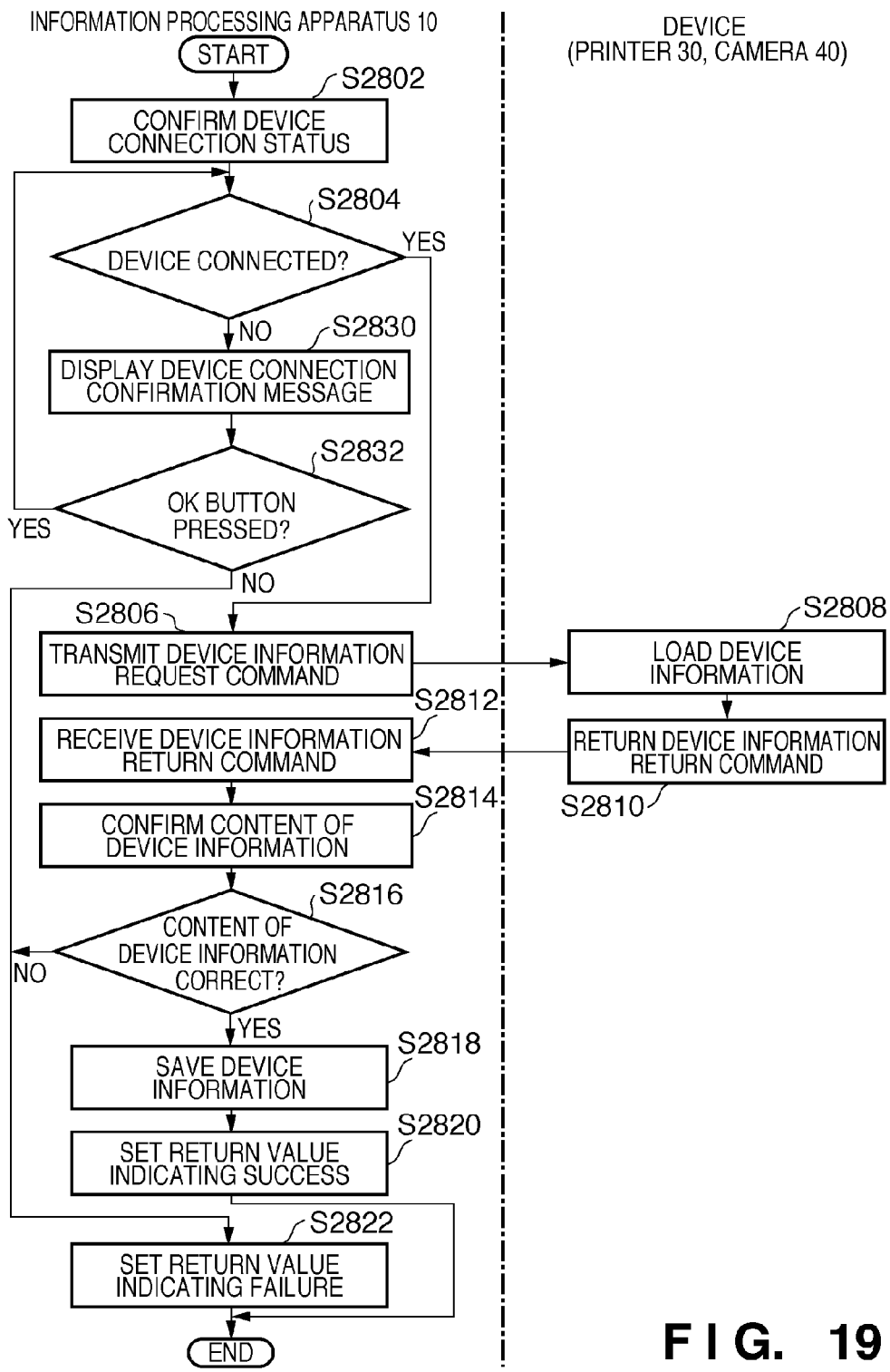
FIG. 19 is a flowchart illustrating automatic device addition processing performed in S2632 shown in FIG. 18.

Hereinafter, the process for automatically adding a device, indicated in S2632 of FIG. 18, shall be described with reference to FIG. 19. When the automatic add button 1138 in the new member registration page 1100 shown in FIG. 8 is pressed, or when the automatic add button in the registered information update page 1200 shown in FIG. 9 is pressed, the process for automatically adding a device, shown in FIG. 19, commences.

First, the connection status of the device (for example, the printer 30, the camera 40, or the like) is confirmed by the plugin 141 of the information processing apparatus 10 (S2802).

When a device is connected (YES in S2804), the device information request command shown in FIG. 13A is transmitted to that device (S2806).

In the device that received the device information request command shown in FIG. 13A, the device information is loaded (S2808), and the device information return command shown in FIG. 13B or 13C is generated. This device information return command is then returned from the device to the information processing apparatus 10 (S2810).

When the device information return command is received by the information processing apparatus 10 from the device (S2812), the content of the device information contained in the device information return command is confirmed by the plugin 141 (S2814).

When the necessary device information, such as the manufacturer name, model name, serial number and so on, is included in the content of the device information and is correct (YES in S2816), that device information is saved (S2818). The return value is then set to indicate success (that is, that the obtainment of the device information has succeeded) (S2820), and the processing for automatically adding a device ends.

However, when the content of the device information is incorrect (NO in S2816), the return value is set to indicate failure (that is, that the obtainment of the device information has failed) (S2822), and the processing for automatically adding a device ends.

Meanwhile, when a device is not connected (NO in S2804), the device connection confirmation message 2000 shown in FIG. 15A is displayed (S2830).

When the OK button 2002 in the device connection confirmation message 2000 is pressed, the device connection status is reconfirmed (S2802). However, when the cancel button 2004 in the device connection confirmation message 2000 is pressed, the return value is set to indicate failure (that is, that the obtainment of the device information has failed) (S2822), and the processing for automatically adding a device ends.

Note that when identical device information is already saved in association with the same user information in step S2818, that information is overwritten.

Figure 20:
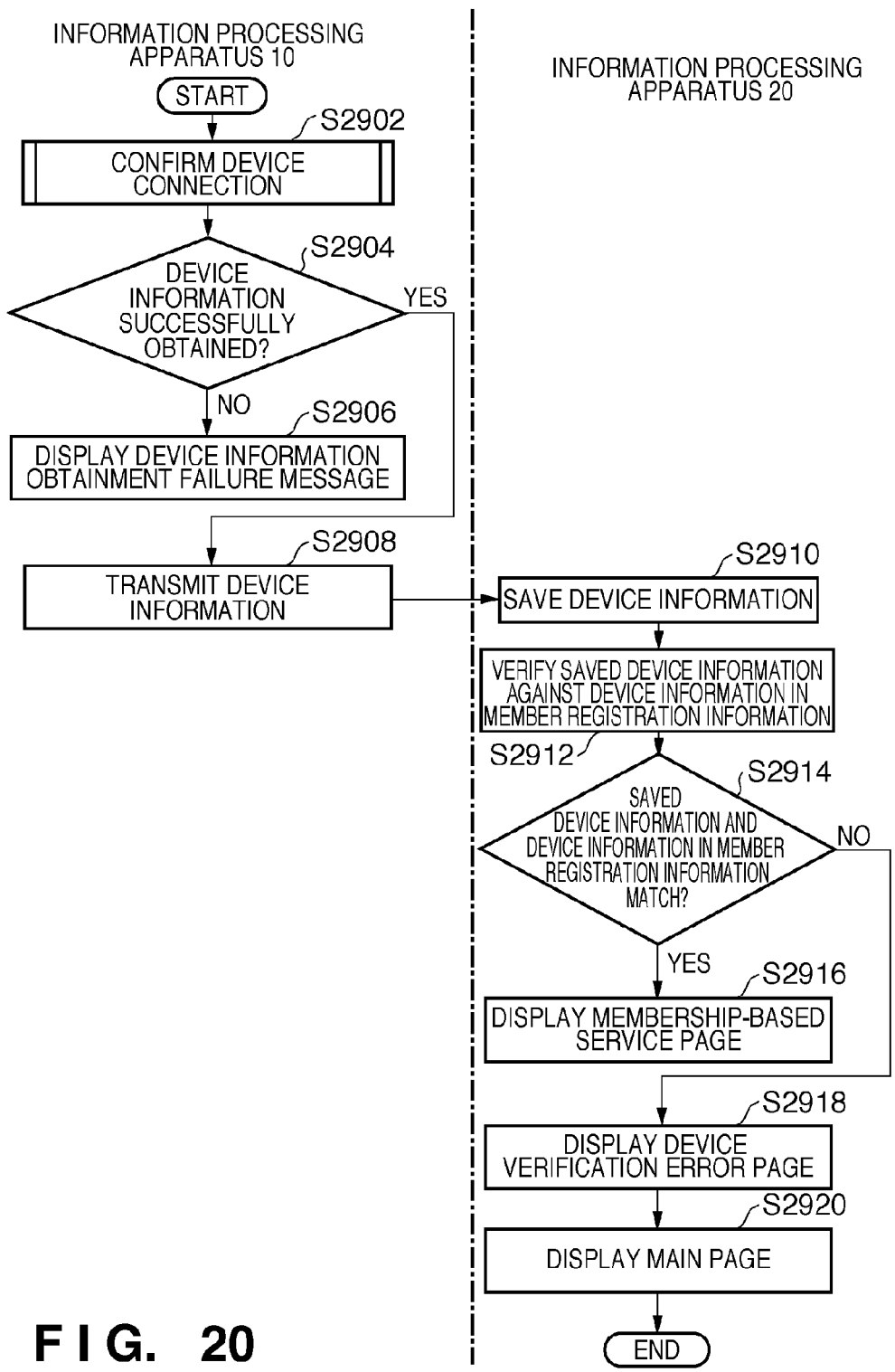
FIG. 20 is a flowchart illustrating processing, performed in the system shown in FIG. 1, for providing a membership-based service provided by a company ABC.

Hereinafter, the processing for providing a membership-based service provided by the company ABC, performed in the system 1, shall be described with reference to FIG. 20. Here, the information processing apparatus 10 accesses the URL of the main page and makes a login request to the web server 210 of the information processing apparatus 20, after which a user ID and password are entered. If the user ID and password that are transmitted match member information that is already registered in the information processing apparatus 20, the login authentication is considered a success, and thus the main page 900 is set in the web server 210, and is provided to and displayed in the information processing apparatus 10. When the online photo album start button 812 or the graphics printing start button 814 in the main page 900 shown in FIG. 7 is pressed in the information processing apparatus 10, the processing for providing a membership-based service, illustrated in FIG. 20, commences.

First, the processing for confirming that a device has connected to the information processing apparatus 10 is executed by the plugin 141 of the information processing apparatus 10 (S2902). The process for confirming that a device has connected shall be described in detail later.

When the plugin 141 of the information processing apparatus 10 has failed to obtain the device information (NO in S2904), the device information obtainment failure message 2100 shown in FIG. 15C is displayed (S2906).

When, however, the plugin 141 of the information processing apparatus 10 has succeeded in obtaining the device information (YES in S2904), that device information is transmitted from the information processing apparatus 10 to the information processing apparatus 20 (S2908).

Having received the device information from the information processing apparatus 10, the information processing apparatus 20 temporarily saves that device information (S2910). The database 1800 shown in FIG. 14 is then referred to, and the device information temporarily saved in S2910 is verified against the device information in the member registration information of the member who has logged in (S2912).

First, the case where the temporarily-saved device information and the device information in the member registration information of the member who has logged in match in S2914 (YES in S2914) shall be described. In this case, the page of the membership-based service is provided to the information processing apparatus 10 by the web server 210 of the information processing apparatus 20, and is displayed therein (S2916). For example, when the online photo album start button 812 has been pressed, the online photo album page 1300 shown in FIG. 10 is displayed, whereas when the graphics printing start button 814 has been pressed, the graphics printing page 1400 shown in FIG. 11 is displayed. The case where the temporarily-saved device information and the device information in the member registration information of the member who has logged in match indicated in S2914 is equivalent to the case where the device information that was temporarily saved in S2910 is present in the device information in the member registration information of the member who is logged in.

Next, the case where the temporarily-saved device information and the device information in the member registration information of the member who has logged in do not match in S2914 (NO in S2914) shall be described. In this case, the device verification error page 1600 shown in FIG. 12 is displayed (S2918). The case where the temporarily-saved device information and the device information in the member registration information of the member who has logged in do not match indicated in S2910 is equivalent to the case where the device information that was temporarily saved in S2910 is not present in the device information in the member registration information of the member who is logged in.

When the OK button 1604 in the device verification error page 1600 is pressed, the main page 900 shown in FIG. 7 is displayed by the web server 210 of the information processing apparatus 20 (S2920), and the process for providing a membership-based service ends.

Note that the information processing apparatus 20 changes the provided membership-based service depending on the content of the device information in the member registration information. For example, the information processing apparatus 20 provides the graphics printing page only to the information processing apparatus 10 of a user whose member registration information contains device information for a specific printer.

According to the system 1 of the present embodiment, identical device information is permitted to be registered again when the device is automatically added (S2632 in FIG. 18), and thus it is possible to perform overlapping member registrations for a single device using multiple usernames. Accordingly, when, for example, a single device such as the printer 30 or the camera 40 is shared among family members (multiple users), each of the family members can perform his or her own member registration for the same printer 30 or camera 40. This makes it possible to prevent the loss of privacy among the family members. Furthermore, because it is necessary to connect a device to the information processing apparatus 10 in order to automatically add that device, the users who can perform the overlapping member registrations are limited to the users who are the proper owners of the device. As a result, a third party that is not a proper owner of the device cannot make an overlapping member registration using the same device information, which makes it possible to prevent the unauthorized use of service by a third party.

Moreover, such overlapping registrations cannot be made when manually adding a device; the registration can only be executed upon the first addition. This makes it possible to prevent multiple users from making unauthorized manual registrations, and prevent unauthorized manual registrations from being made multiple times.

<Second Embodiment>

Mobile devices used by individuals, such as compact cameras and mobile telephones, are often used individually and are not shared, as opposed to stationary devices such as printers. Mobile devices are also easy to lend to and borrow from other people. Accordingly, with such mobile devices, there are situations where performing overlapping member registrations using multiple usernames on a single device is not appropriate, even when the device information has been automatically input. In such a case, whether or not a device can be shared may be set for the individual devices, which shall be described hereinafter.

FIG. 21 is a diagram illustrating an example of a table 3100 expressing whether or not a device can be shared. The table 3100 indicates whether or not a device can be shared, or in other words, whether to allow or prohibit multiple usernames to perform overlapping member registrations for a membership-based service provided by the company ABC using a single device (allowance/prohibition information).

As seen in FIG. 21, printers Kmmn and Xyz, which are devices shared by a family, are allowed to be shared. As opposed to this, cameras KKK and MMM and a phone Nmmk, which are devices used by individuals, are prohibited from being shared.

Figure 22:
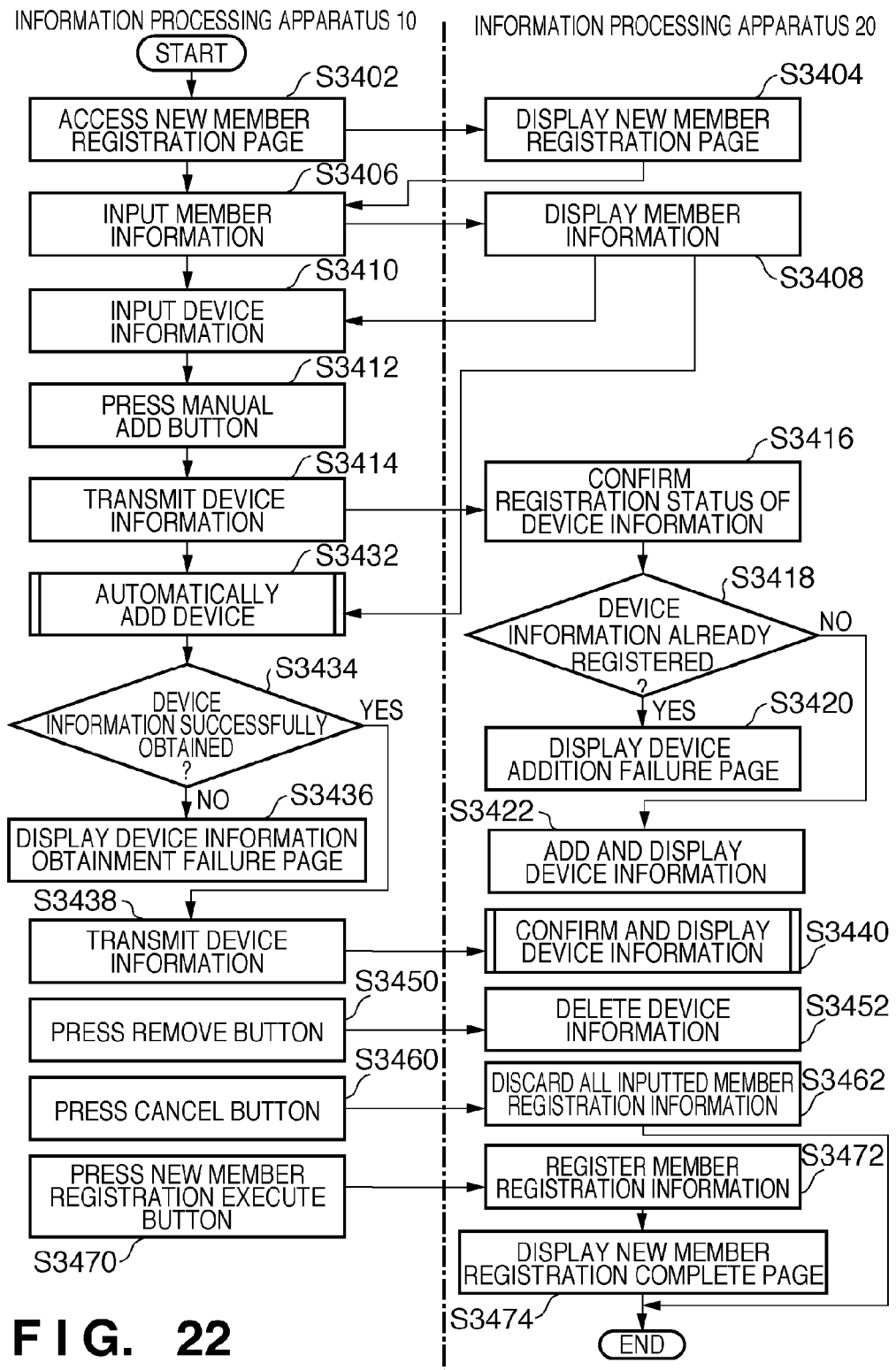
FIG. 22 is a flowchart illustrating the processing, performed in the system shown in FIG. 1, for new member registration or a registered member information update for a membership-based service provided by a company ABC.

Hereinafter, the processing for registering as a new member with a membership-based service provided by the company ABC, performed in the system 1, shall be described with reference to FIG. 22. Note that the registration update processing is carried out in the same manner as the new member registration processing, and thus descriptions thereof shall be omitted. In addition, because this processing contains many steps that overlap with those illustrated in FIG. 18, only the steps that differ shall be described. Specifically, the processing in FIG. 22 from when the obtainment of device information succeeds in S3434 up until the device information is transmitted (S3402 to S3438) is the same as S2602 to S2638 in FIG. 18. Furthermore, in FIG. 22, the processes in S3450, S3452, S3460, S3462, and S3470 to S3474 are the same as the processes in S2640, S2642, S2650, S2652, and S2660 to S2664 in FIG. 18.

Having received the device information from the information processing apparatus 10, the information processing apparatus 20 executes a process for confirming and displaying that device information (S3440).

Figure 23:
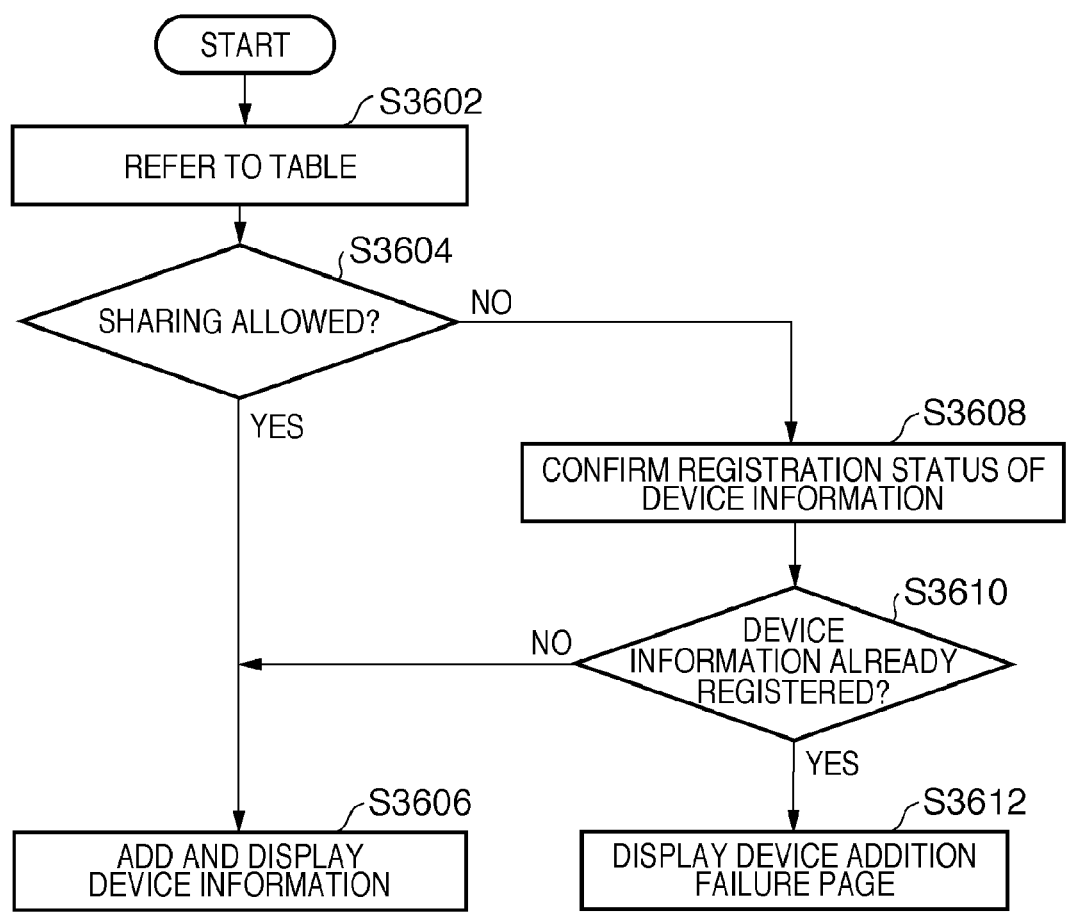
FIG. 23 is a flowchart illustrating processing for confirming and displaying device information performed in S3440 shown in FIG. 22.

Hereinafter, the process for confirming and displaying device information, indicated in S3440 of FIG. 22, shall be described with reference to FIG. 23. This processing is executed by the information processing apparatus 20.

First, referring to the table 3100 shown in FIG. 21 (S3602), it is confirmed whether sharing of the device indicated by the device information transmitted from the information processing apparatus 10 is allowed or prohibited (S3604).

When sharing is allowed (YES in S3604), the device information from the information processing apparatus 10 is added (registered) and displayed in the device display area 1122 of the new member registration page 1100 or the device display area 1222 of the registered information update page 1200 (S3606).

However, when sharing is prohibited (NO in S3604), the database 1800 shown in FIG. 14 is referred to, and the registration status of the device information is confirmed (S3608).

When the device information from the information processing apparatus 10 is already registered (is already present in the database 1800) (YES in S3610), the device addition failure page 2200 shown in FIG. 16 is displayed. Here, a notification reading "the device 'ABC camera KKK, serial number 777' cannot be added because it is already registered" is displayed in the message display area 2202 of the device addition failure page 2200 (S3612).

When, however, the device information from the information processing apparatus 10 is not registered (is not present in the database 1800) (NO in S3610), the procedure advances to S3606.

In this manner, setting whether or not devices can be shared for each type of device makes it possible to ensure that overlapping member registrations for individually-used mobile devices are not made using multiple usernames, even if those devices have been automatically added.

<Third Embodiment>

When overlapping member registrations for a single device can be made with multiple usernames, it is conceivable that the number of members (user accounts) registered for the device increases dramatically. It is therefore undesirable to provide a certain usable capacity for an online photo album (for example, 100 MB (megabytes) per instance of device information) or a certain number of printable tickets for graphics printing (for example, five per instance of device information) to a single user account. This is because it is necessary to provide an information processing apparatus (server) with a higher storage capacity as the number of user accounts increases, which leads to a considerable increase in cost. Meanwhile, when the storage space in the information processing apparatus approaches capacity, processing requires more time. Accordingly, when overlapping member registrations for a single device can be made with multiple usernames, it is preferable to allocate usable membership-based services on a device-by-device basis (in other words, provide services determined in advance), which shall be described hereinafter.

FIG. 24 is a diagram illustrating an example of a database 3700 for managing members of a membership-based service provided by the company ABC. The database 3700 is managed by the information processing apparatus 20, and associates the member information and device information of a user who has completed member registration (a member) with the name of that member. The members (that is, their member registration information) utilizing a membership-based service of the company ABC, or "Koichi", "Abe", "Konoha", and "Teru", are managed by the database 3700. It is assumed here that "Koichi", "Abe", "Konoha", and "Teru" are family members.

For example, one of the membership-based services of the company ABC is an online photo album service, where 100 MB (megabytes) of usable capacity is allocated to a single device (device information). Another example is a graphics printing service, where five printable tickets are allocated to a single device (device information).

Here, a situation is conceivable where a user (member K) who owns a printer α registers as a member for the membership-based service provided by the company ABC using the device information of the printer α, and there are no other users (members) who have registered the device information of the printer α. In such a case, 100 MB of usable capacity is allocated to the member K for the online photo album service, and thus that member can upload up to 100 MB worth of images such as photographs (image files). Furthermore, five printable tickets are allocated to that member for the graphics printing service, and thus that member can print up to five graphics.

Another situation is conceivable where a user (member M) who owns a printer β and a camera γ registers as a member for the membership-based service provided by the company ABC using the device information of the printer β and the camera γ, and there are no other users (members) who have registered the device information of the printer β and the camera γ. In such a case, 200 MB of usable capacity is allocated to the member M for the online photo album service, and thus that member can upload up to 100 MB worth of images such as photographs (image files). Furthermore, ten printable tickets are allocated to that member for the graphics printing service, and thus that member can print up to ten graphics.

FIGS. 25A and 25B are examples of databases 3800A and 3800B that manage the usage (usage status) of an online photo album and graphics printing, which are membership-based services of a company ABC, respectively. Note that FIG. 25A illustrates the usage status at time A, whereas FIG. 25B illustrates the usage status at time B (for example, three days after time A).

The databases 3800A and 3800B associate the usage status of an online photo album and usage status of graphics printing for a user who has completed member registration (a member) with the name of that member. The usage status of the online photo album refers to the management of the used capacity, remaining usable capacity, and maximum usable capacity, whereas the usage status of the graphics printing refers to the management of the number of used printing tickets, the number of remaining printing tickets, and the maximum number of usable printing tickets.

FIG. 24 indicates that "Koichi" has registered the device information of a printer with a model name of "Printer Kmmn" and a serial number of "800", and a camera with a model name of "Camera KKK" and a serial number of "555". Therefore, a total of 200 MB of usable capacity, or 100 MB for the printer and 100 MB for the camera, are allocated for the online photo album service, and, as shown in FIGS. 25A and 25B, the maximum usable capacity of the online photo album is 200 MB. Furthermore, a total of 10 printable tickets, or five tickets for the printer and five tickets for the camera, are allocated for the graphics printing service, and, as shown in FIGS. 25A and 25B, the maximum usable number of printing tickets for the graphics printing is ten.

Furthermore, FIG. 24 indicates that "Abe", "Konoha", and "Teru" have registered the device information of the printer with the model name of "Printer Kmmn" and the serial number of "800". Therefore, 100 MB of usable capacity is allocated to the printer for the online photo album service, and, as shown in FIGS. 25A and 25B, the maximum usable capacity of the online photo album is 100 MB. Furthermore, five printable tickets are allocated to the printer for the graphics printing service, and, as shown in FIGS. 25A and 25B, the maximum usable number of printing tickets for the graphics printing is ten.

The usable capacity for the online photo album allocated to the printer with the model name "Printer Kmmn" and the serial number "800" is shared among four users, or "Koichi", "Abe", "Konoha", and "Teru". Meanwhile, the usable capacity for the online photo album allocated to the camera with the model name "Camera KKK" and the serial number "555" is held solely by "Koichi". Note that the usable capacity allocated to the camera with the model name "Camera KKK" and the serial number "555" (that is, the usable capacity held solely by "Koichi") is used preferentially when "Kochi" uses the online photo album.

The printable tickets for graphics printing allocated to the printer with the model name "Printer Kmmn" and the serial number "800" are shared among four users, or "Koichi", "Abe", "Konoha", and "Teru". However, the printable tickets for graphics printing allocated to the camera with the model name "Camera KKK" and the serial number "555" are held solely by "Koichi". Note that the printable tickets allocated to the camera with the model name "Camera KKK" and the serial number "555" (that is, the printable tickets held solely by "Koichi") are used preferentially when "Kochi" uses the graphics printing service.

For example, in FIG. 25A, the online photo album capacity used by "Abe", "Konoha", and "Teru" (50 MB total) is provided out of the aforementioned usable capacity allocated to the printer. Therefore, the remaining usable capacity for "Abe", "Konoha", and "Teru" is 100−20−30−0, or 50 MB. Note that the online photo album capacity used by "Koichi" (10 MB) is provided preferentially out of the aforementioned usable capacity allocated to the camera. However, the aforementioned usable capacity allocated to the printer is also provided to "Koichi". Therefore, the remaining usable capacity for "Kocihi" is 140 MB, obtained by adding the aforementioned remaining usable capacity allocated to the camera (100−10, or 90 MB) to the remaining usable capacity for "Abe", "Konoha", and "Teru" (50 MB).

Meanwhile, in FIG. 25B, the printable tickets for graphics printing used by "Abe", "Konoha", and "Teru" (five tickets) are provided out of the aforementioned printable tickets allocated to the printer. Therefore, the number of remaining printing tickets for "Abe", "Konoha", and "Teru" is 5−1−1−2, or one ticket. Note that the used printing tickets for graphics printing used by "Koichi" (three tickets) are provided preferentially out of the aforementioned printable tickets (five tickets) allocated to the camera. However, the aforementioned printable tickets for graphics printing allocated to the printer are also provided to "Koichi". Therefore, the number of remaining printable tickets for "Kocihi" is three, obtained by adding the aforementioned remaining printable tickets allocated to the camera (5−3, or two tickets) to the remaining printable tickets for "Abe", "Konoha", and "Teru" (one ticket).

In this manner, allocating the usable membership-based services on a device-by-device basis makes it possible to provide the membership-based services in an equal manner to users who share the device. Furthermore, because the membership-based services are not allocated to user accounts, unauthorized use, such as where multiple user accounts are purposefully created for a single device so as to use the membership-based services improperly, can be prevented.

The object of the present invention can also be achieved by supplying, to a system or apparatus, a storage medium in which the program code for software that realizes the functions of the aforementioned embodiments has been stored. Thus, it goes without saying that the object of the present invention can also be achieved by loading and executing the program code stored in the storage medium using a computer (or CPU or MPU) of the system or apparatus.

FIG. 26 is a diagram illustrating the memory map of a storage medium 3900 that stores a software program (a computer-readable program for processing various types of data) for realizing the functions of the abovementioned embodiments. Note that there are cases where the storage medium 3900 also stores information for managing groups of programs stored in the storage medium 3900 (for example, version information, the author, and so on) and information dependant on the OS or the like that reads out the program (for example, icons representing the program).

A storage portion 3902 is, in the present embodiment, configured of a hard disk.

A directory information management portion 3904 manages data belonging to various programs.

A program storage portion 3906 stores programs for installing various other programs onto an information processing apparatus, programs for unpacking programs to be installed (when those programs to be installed are in a compressed state), and so on.

The program code read out from the storage medium realizes the functionality of the aforementioned embodiments, and thus the storage medium in which the program code is stored composes the present invention. Examples of the storage medium that can be used to store (supply) the program code include flexible disks, hard disks, optical disks, magneto-optical disks, CD-ROMs, CD-Rs, magnetic tape, non-volatile solid-state memory cards, ROMS, and so on.

There are cases where the functions of the aforementioned embodiments are realized by a computer reading out and executing the program code. However, it goes without saying that the case where an operating system (OS) or the like running on a computer performs part or all of the actual processing based on instructions in the program code, and the functionality of the aforementioned embodiments is realized by that processing, is included in the scope of the present invention.

Furthermore, there are cases where the program code read out from the storage medium is written into a memory provided in a function expansion board installed in the computer or a function expansion unit connected to the computer. Therefore, it goes without saying that the case where a CPU or the like included in the function expansion board or function expansion unit performs all or part of the actual processing based on instructions included in the program code, and the functionality of the aforementioned embodiments is realized by that processing, also falls within the scope of the present invention.

Although in the above embodiments, an online photo album and graphics printing were given as examples of membership-based services provided by the company ABC, it should be noted that the present invention can be applied to any service, such as photo printing, paper crafts, and so on.

Furthermore, although the manufacturer name, model name, and serial number were used as the device information in the above embodiments, any information, such as the brand name, type name, purchase data, firmware version, color, date of manufacture, and so on can be used as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2008-148325 filed on Jun. 5, 2008, which is hereby incorporated by reference herein in its entirety.

What is claimed is:

1. A system, comprising:
a first information processing apparatus capable of connecting to a peripheral device; and
a second information processing apparatus, that registers user information based on device information unique to the peripheral device,
wherein the first information processing apparatus includes:
a first obtainment unit configured to obtain the device information from the peripheral device connected to the first information processing apparatus;
a second obtainment unit configured to obtain device information manually inputted by a user;
a first transmission unit configured to transmit the user information for specifying a user to use the peripheral device to the second information processing apparatus; and
a second transmission unit configured to transmit the device information obtained by the first obtainment unit or the second obtainment unit to the second information processing apparatus, and
the second information processing apparatus includes:
a first reception unit configured to receive the user information transmitted by the first transmission unit;
a second reception unit configured to receive the device information transmitted by the second transmission unit;
a registration unit configured to register the user information received by the first reception unit in association with the device information received by the second reception unit; and
a control unit configured to control to permit the registration unit to register multiple user information in association with single device information if the device information received by the second reception unit has been obtained by the first obtainment unit, but control to prohibit the registration unit from registering multiple user information in association with the single device information if the device information received by the second reception unit has been obtained by the second obtainment unit.

2. The system according to claim 1, wherein the control unit controls to permit the registration unit to register a multiple different combination of different users information and the same device information corresponding to a shared peripheral device if the device information received by the second reception unit has been obtained by the first obtainment unit.

3. The system according to claim 1, wherein
the second information processing apparatus further includes a determination unit configured to determine whether or not the user information is registered in association with the device information, and
the control unit controls to permit the registration unit to register a combination of new user information and the same device information if the determination unit determines that the user information has already been registered and the device information is obtained by the first obtainment unit, but controls to prohibit the registration unit from registering a combination of new user information and the same device information if the determination unit determines that the user information has already been registered and the device information is obtained by the second obtainment unit.

4. An information processing apparatus that registers user information based on device information unique to a peripheral device, the information processing apparatus comprising:
- a first reception unit configured to receive the user information for specifying a user to use the peripheral device;
- a second reception unit configured to receive the device information;
- a registration unit configured to register the user information received by the first reception unit in association with the device information received by the second reception unit; and
- a control unit configured to control to permit the registration unit to register multiple user information in association with single device information if the device information received by the second reception unit has been obtained from the peripheral device, but control to prohibit the registration unit from registering multiple user information in association with the single device information if the device information has been manually inputted by a user.

5. The information processing apparatus according to claim 4, further comprising a setting unit configured to set, for each type of peripheral device, whether or not registering multiple user information for each device information is permitted,
- wherein the control unit controls to permit the registration unit to register multiple user information in association with the single device information if the device information received by the second reception unit has been obtained from the peripheral device and the setting unit sets, for each type of peripheral device, that registering multiple user information in association with the single device information is permitted.

6. The information processing apparatus according to claim 4, further comprising a management unit configured to manage an amount of a service provided to a user corresponding to the user information,
- wherein the management unit manages the amount of the service for each instance of device information registered in association with the user information.

7. A control method that registers user information based on device information unique to a peripheral device, the method comprising the steps of:
- receiving the user information for specifying a user to use the peripheral device and the device information; and
- controlling to permit the registration of multiple user information in association with single device information if the device information obtained from the peripheral device, but controlling to prohibit the registration of multiple user information in association with the single device information if the device information has been manually inputted by a user.

8. A non-transitory computer-readable storage medium in which is stored a program that causes a computer to execute a control method that registers user information based on device information unique to a peripheral device, the program causing the computer to execute the steps of:
- receiving the user information for specifying a user to use the peripheral device and the device information; and
- controlling to permit the registration of multiple user information in association with the single device information if the device information obtained from the peripheral device, but controlling to prohibit the registration of multiple user information in association with the single device information if the device information has been manually inputted by a user.

9. The information processing apparatus according to claim 4, wherein the control unit controls to permit the registration unit to register a multiple different combination of different users information and the same device information if the device information received by the second reception unit has been obtained from the peripheral device.

10. The information processing apparatus according to claim 4, wherein
- the second information processing apparatus further includes a determination unit configured to determine whether or not the user information is registered in association with the device information; and
- the control unit controls to permit the registration unit to register a combination of new user information and the same device information if the determination unit determined that user information has already been registered and the device information has been obtained from the peripheral device, but controls to prohibit the registration unit from registering a combination of new user information and the same device information if the determination unit determined that user information has already been registered and the device information has been manually inputted by a user.

* * * * *